US012785797B2

(12) United States Patent
Krishnamurthy et al.

(10) Patent No.: US 12,785,797 B2
(45) Date of Patent: Nov. 3, 2026

(54) SYSTEM AND METHODS FOR CLOSED LOOP DOPPLER TRACKING IN INTER-SATELLITE LINKS

(71) Applicant: Altera Corporation, San Jose, CA (US)

(72) Inventors: Sundar Krishnamurthy, Dublin, CA (US); Conor O'Keeffe, Cork (IE); Deepak Dasalukunte, Beaverton, OR (US); Finbarr O'Regan, Innishannon (IE); Abhinav Vinod, San Jose, CA (US)

(73) Assignee: Altera Corporation, San Jose, CA (US)

( * ) Notice: Subject to any disclaimer, the term of this patent is extended or adjusted under 35 U.S.C. 154(b) by 401 days.

(21) Appl. No.: 17/972,965

(22) Filed: Oct. 25, 2022

(65) Prior Publication Data

US 2024/0137115 A1 Apr. 25, 2024
US 2024/0235665 A9 Jul. 11, 2024

(51) Int. Cl.
*H04B 7/185* (2006.01)

(52) U.S. Cl.
CPC ....... *H04B 7/1855* (2013.01); *H04B 7/18513* (2013.01); *H04B 7/18521* (2013.01); *H04B 7/18543* (2013.01)

(58) Field of Classification Search
CPC .............. H04B 7/1855; H04B 7/18513; H04B 7/18521; H04B 7/18543
See application file for complete search history.

(56) References Cited

U.S. PATENT DOCUMENTS 12,003,350 B1 * 6/2024 McCormick ....... H04B 7/18513
12,323,199 B2 * 6/2025 Frankel ................. H04B 7/185
(Continued)

FOREIGN PATENT DOCUMENTS

CN 1396732 A * 2/2003
CN 1404226 A * 3/2003
(Continued)

OTHER PUBLICATIONS

De Arruda Mello, Darli Augusto, "section 6.1 Frequency recovery Digital Coherent Optical Systems: Architecture and Algorithms", Springer Cham, (2021), 4 pgs.
(Continued)

*Primary Examiner* — Michael A Keller
(74) *Attorney, Agent, or Firm* — Nicholson De Vos Webster & Elliott LLP

(57) ABSTRACT

An apparatus can include transceiver circuitry to receive an input signal from a target apparatus. The apparatus can further include a processing circuitry to determine position information of a source object and a target object. Based on the position information, the processing circuitry can calculate a relative velocity and determine a Doppler shift or carrier frequency offset in the input signal based on the relative velocity. The processing circuitry can adjust a local oscillator frequency based on a Doppler measured using the position information in an initial link acquisition phase. The processing circuitry can track the Doppler continuously over a range of tens of gigahertz accounting for Doppler phase ambiguities, and correct for a tracked Doppler shift by partially adjusting a local oscillator frequency and by correcting a residual Doppler shift digitally.

25 Claims, 12 Drawing Sheets

(56) References Cited

U.S. PATENT DOCUMENTS

| | | | | |
|---|---|---|---|---|
| 2016/0187489 | A1* | 6/2016 | Gurumani | H04B 7/18515 342/357.65 |
| 2025/0216558 | A1* | 7/2025 | Neish | G01S 19/07 |

FOREIGN PATENT DOCUMENTS

| | | | | | |
|---|---|---|---|---|---|
| CN | 103546211 | A | * | 1/2014 | |
| CN | 104518786 | A | * | 4/2015 | |
| CN | 108566266 | A | * | 9/2018 | H04L 5/0048 |
| CN | 111148161 | B | * | 7/2023 | H04W 28/08 |
| ES | 2983838 | T3 | * | 10/2024 | H04W 84/06 |
| JP | 2000214243 | A | * | 8/2000 | |
| JP | 2017175326 | A | * | 9/2017 | |

OTHER PUBLICATIONS

Huang, Dezhao, "Accurate Two-Stage Frequency Offset Estimation for Coherent Optical Systems", IEEE Photonics Technology Letters, (Jan. 2013), 4 pgs.

Zhang, S, "Dual-Stage Cascaded Frequency Offset Estimation for Digital Coherent Receivers", IEEE Photonics Technology Letters, (Mar. 2010), 3 pgs.

* cited by examiner

SYSTEM AND METHODS FOR CLOSED LOOP DOPPLER TRACKING IN INTER-SATELLITE LINKS

TECHNICAL FIELD

Aspects pertain to optical or wireless communications. In particular, aspects relate to inter-satellite optical communications.

BACKGROUND

Inter satellite links are designed between various satellites in low earth orbits (LEO) and Geo-stationary earth orbits (GEO). Satellites travel at high relative velocity with respect to one another and with respect to communications devices (whether mobile or stationary) on the earth's surface with respect to moving objects in the atmosphere or space. This can lead to large Doppler shifts in the communication signal between multiple satellites and between satellites and devices on the surface of the earth. Coherent optical systems enable high data rate links at 100 Giga bits per second (Gbps) or higher, but such terrestrial solutions are not prone to high Doppler shifts. Therefore, transceivers designed for fiber optic systems cannot be directly adopted in satellite systems. There is a growing need to efficiently mitigate the effect of large Doppler shifts for satellite communications in both optical and wireless systems.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
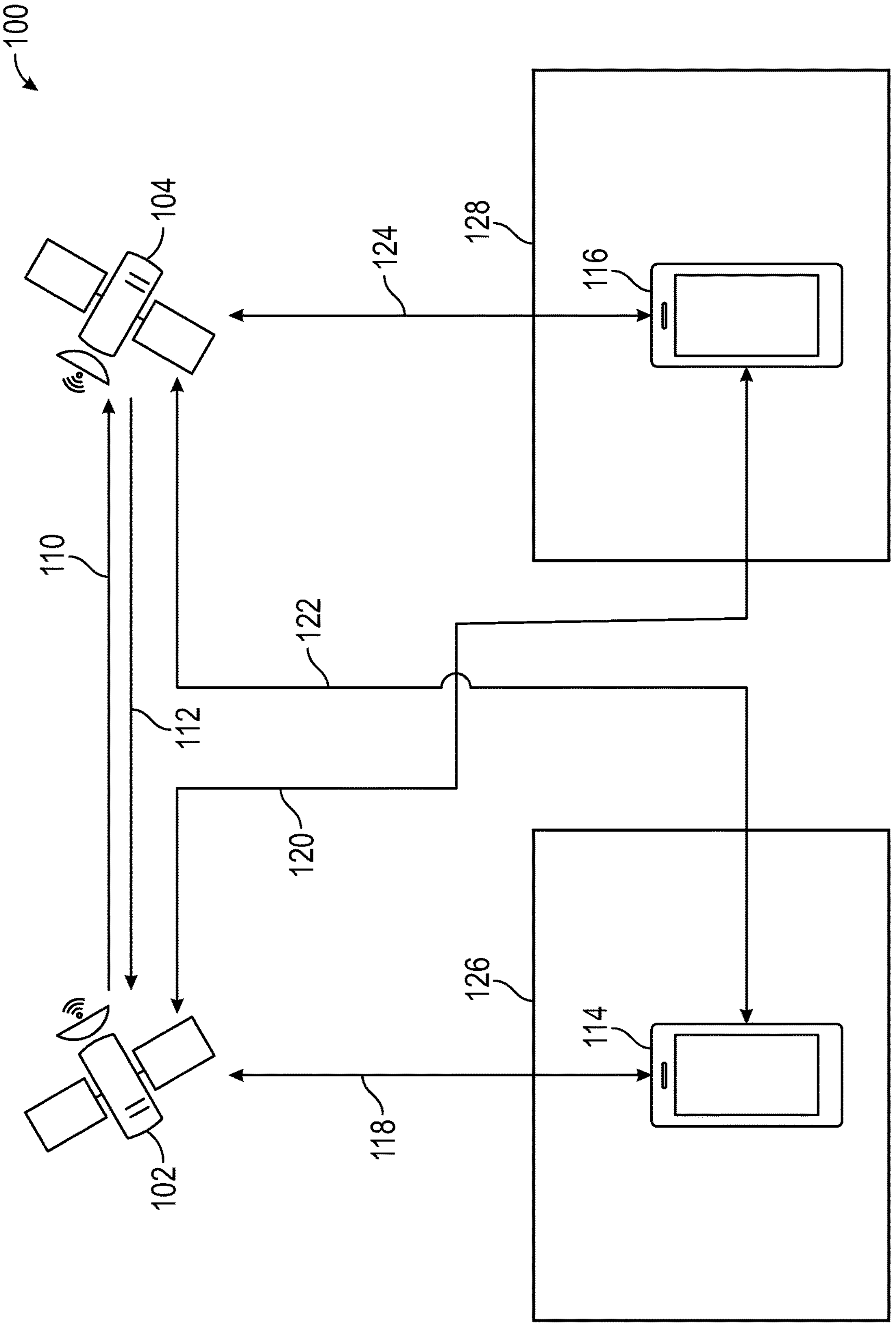
FIG. 1 is a block diagram of a wireless communication system that can include satellite communication systems in accordance with some aspects.

FIG. 1 is a block diagram of a wireless communication system 100 that can include satellite communication systems in accordance with some aspects. The system 100 can include two or more satellites 102, 104. While two satellites 102, 104 are shown, the wireless communication system 100 can include any number of satellites or other communications devices. The communication links between the satellites could be established based on optical links using coherent optical transceivers. The satellites 102, 104 can be located, for example, at a geostationary or non-geostationary orbital location. Where a satellite 102, 104 is in a non-geostationary orbit, the satellite 102, 104 may be a low earth orbit (LEO) satellite. Satellite 102, 104 may be communicatively coupled to subscribers terminals 114, 116. The term subscriber terminals may be used to refer to a single subscriber terminal or multiple subscriber terminals. A subscriber terminal 114, 116 is adapted for communication with the satellite 102, 104. Subscriber terminals may include fixed and mobile subscriber terminals including, but not limited to, a cellular telephone, a wireless handset, a wireless modem, a data transceiver, a paging or position determination receiver, or mobile radio-telephone, or a headend of an isolated local network. A subscriber terminal 114, 116 may be hand-held, portable (including vehicle-mounted installations for cars, trucks, boats, trains, planes, etc.) or fixed as desired. A subscriber terminal 114, 116 may be referred to as a wireless communication device, a mobile station, a mobile wireless unit, a user, a subscriber, or a mobile. Where the communication platform of a wireless communication system is a satellite, the wireless communication system can be referred to more specifically as a satellite communication system. In accordance with certain embodiments, it is possible that a subscriber terminal 114, 116 with which one satellite 102, 104 wirelessly communicates is on a platform of or on another satellite.

Subscriber terminals 114, 116 and satellite 102, 104 communicate over beams 118, 120, 122, 124. For example, FIG. 1 shows beams 118, 120, 122, 124 for illuminating regions 126 and 128 having subscriber terminals therein. In many embodiments, the communication system will include more than four beams (e.g., sixty, one hundred, etc.). Each beam 118, 120, 122, 124 can have an uplink and a downlink. Although FIG. 1 only shows two subscriber terminals 114, 116 within each region 126, 128, a typical system may have thousands of subscriber terminals within each region 126, 128. In the embodiments described herein, it is assumed that the service beams (both downlink and uplink) are RF beams, as opposed to optical beams.

Either or both satellite 102, 104 can comprise a spacecraft and one or more payloads (e.g., the communication payload, an imaging payload, etc.). The satellite 102, 104 may also include a command and data handling system and multiple power sources, such as batteries, solar panels, and one or more propulsion systems, for operating the spacecraft and the payload. The command and data handling system can be used, e.g., to control aspects of a payload and/or a propulsion system but is not limited thereto.

The Sixth Generation (6G) wireless communication network is expected to integrate various terrestrial, aerial and satellite networks into a reliable, high throughput network supporting massive number of devices. In particular, satellite communication enables connectivity to numerous terrestrial and maritime regions where it has been difficult for cellular networks to reach and provide high quality of service. Numerous satellite constellations have been deployed in various LEO orbits that have enabled distribution of connectivity service without the costs associated with cellular network infrastructure.

Most of these commercial LEO satellite constellations and various government LEO or Geo-stationary earth orbit (GEO) constellations are highly fragmented making it difficult for networks to route information efficiently. Methods and apparatuses according to aspects seek to bridge various LEO-LEO and LEO-GEO satellite constellations through optical inter-satellite links with a reconfigurable modem design with low size, weight, power and cost metrics (SWAP-C).

Each satellite 102, 104 can communicate with other satellites (e.g., each other or other satellites not shown in FIG. 1) over respective inter-satellite link (ISL) beams 110, 112. For example, the satellite 102 can send data to the satellite 104 over the ISL beam 110 and can receive data from the satellite 104 over the ISL beam 112. LEO and GEO satellites orbit the earth at a high velocity to escape the earth's gravitational pull. Different LEO and GEO satellites in various constellations experience high relative velocity with respect to one another. This leads to a wide range of Doppler shifts in the communication signal between various LEO-LEO and LEO-GEO satellites. Shifts can also occur in communication signals between LEO and GEO satellites and objects on the surface of the earth, for example mobile and stationary user devices, military devices, etc. In high data rate Coherent Optical DSP, Doppler tracking is performed using blind methods involving the M-th power of the signal, wherein M is chosen based on the modulation scheme and performing either a Fast Fourier Transform (FFT) or a correlation. Doppler range is limited in many data center and terrestrial fiber solutions, and so, such simple methods can be adopted. However, in inter satellite links between various LEO and GEO satellites, range of Doppler variations can be quite high, requiring highly efficient Doppler tracking.

Figure 2:
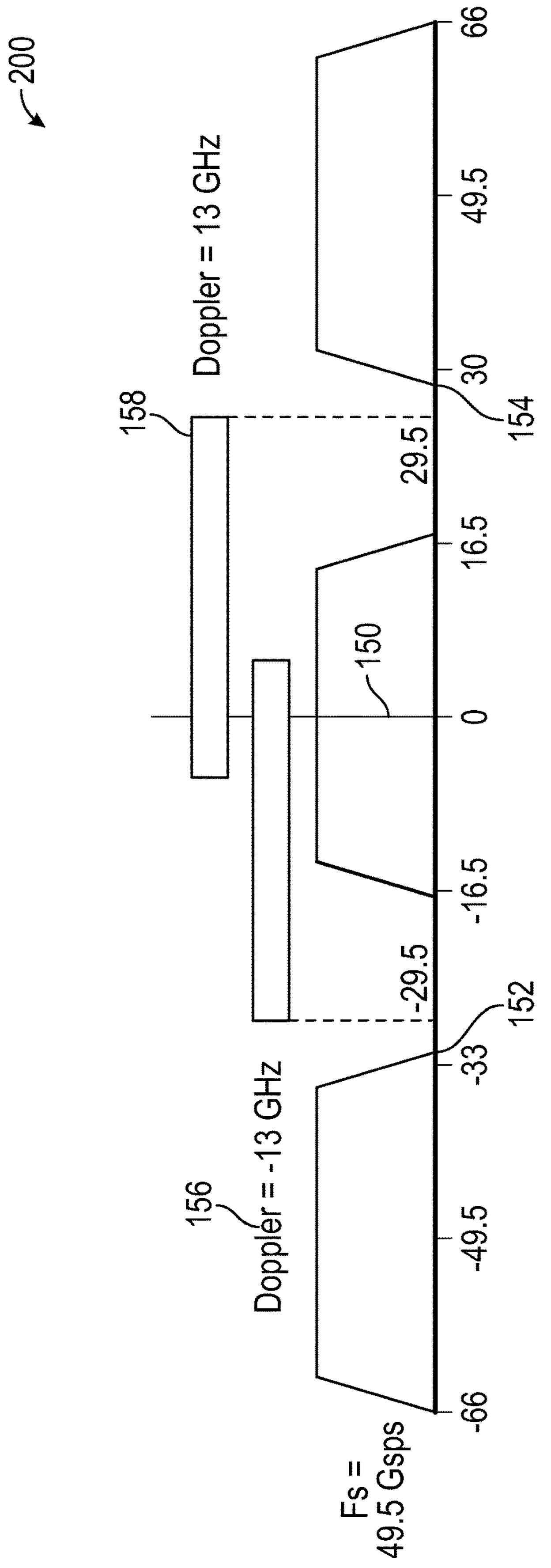
FIG. 2 illustrates a Doppler shift in a communication signal.

FIG. 2 illustrates Doppler shift 200 in a signal. In an example signal bandwidth of 33 GHz, a center frequency at point 150 may cover bandwidth from point 152 to point 154. An oversampling factor of 1.5 times can be applied at digital-to-analog converter (DAC) or analog-to-digital converter (ADC) circuitry operating at 49.5 gigasamples per second (Gsps) in transceiver circuitry described later herein.

Doppler shift in the signal can be calculated from the relative velocity based on the orbital motion of the satellites. In some examples, a maximum of +/−50 ppm Doppler can be experienced or observed due to the satellite orbital motion, which corresponds to +/−10 GHz of carrier frequency offset. In addition, clock inaccuracies at the transmitter and the receiver could lead to +/−3 GHz offset, since there could be +/−1.5 GHz clock, e.g., local oscillator (LO) offset at the transmitter and the receiver. Hence, a carrier frequency offset of +/−13 GHz could be present as shown at points 156, 158 with respect to the expected signal. As seen in the example illustrated in FIG. 2, the Doppler shift in a communication can lead to an offset in the signal bandwidth and inappropriate frequencies being used to receive the signal. For example, a transceiver LO may typically be centered at 49.5 GHz to capture a transmitted signal considering the Doppler fluctuations. Since the bandwidth of the signal processed by the ADC and the Trans-Impedance Amplifier (TIA) can affect the performance considerably, more of the Doppler must typically be adjusted in the LO than in the DSP. The DSP can track the residual Doppler and adjust as necessary, including rapid fluctuations if any. In aspects of the present disclosure, an LO control algorithm can help manage the Doppler correction in a two stage scheme, using filtered Doppler at the DSP, position based Doppler and by using appropriate thresholds.

Communication modems used in inter-satellite communications primarily consist of optical components, data converters and digital logic performing baseband signal processing. Although most aspects of the disclosure relate to baseband circuitry, other portions of communications architecture can be affected by the methodologies according to aspects, including software-configured elements, such as processing elements including DSPs, and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some aspects, the functional elements may refer to one or more processes operating on one or more processing elements.

Figure 3:
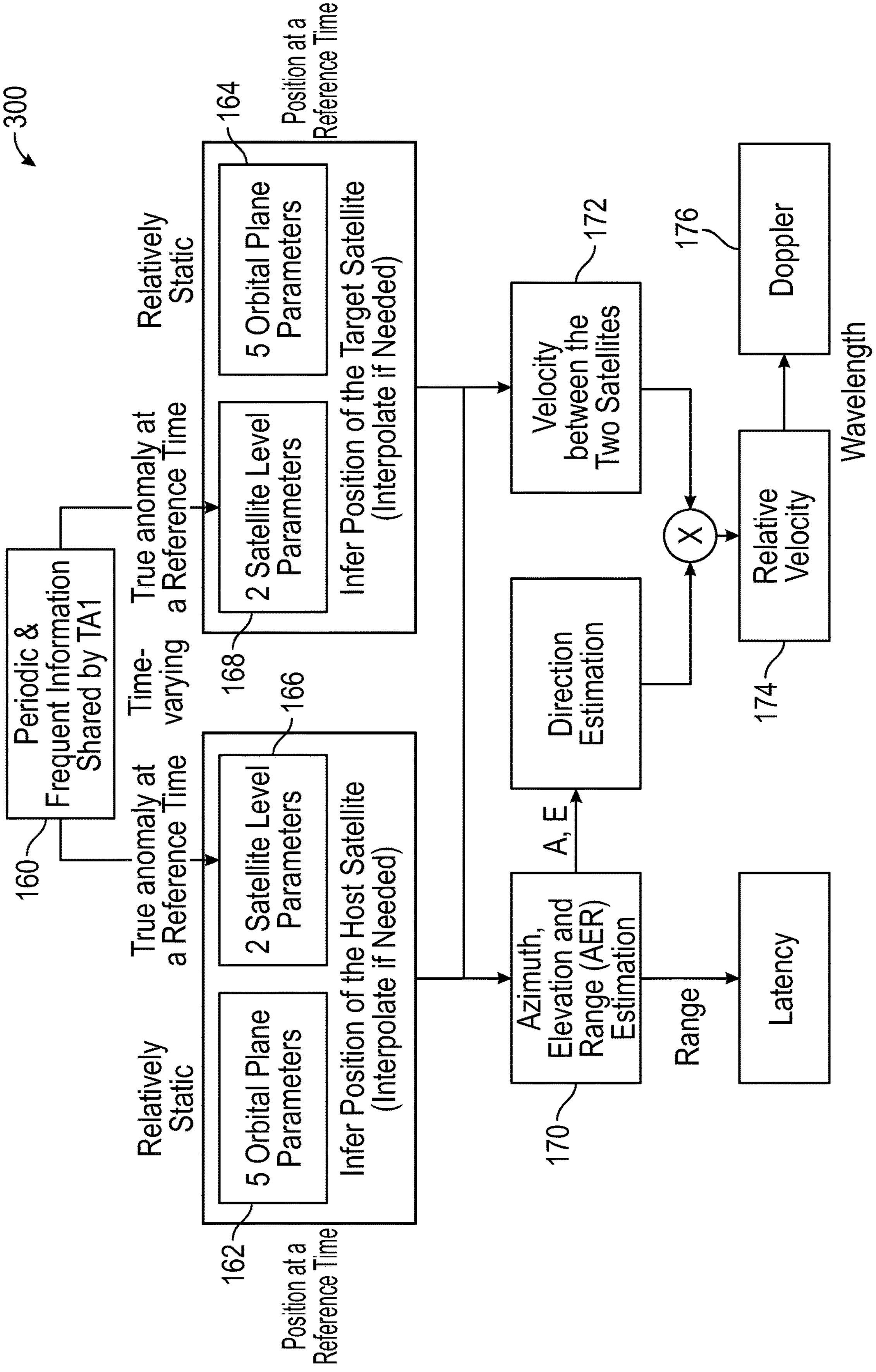
FIG. 3 illustrates determining relative position, Doppler and other related parameters of satellites in accordance with some aspects.

FIG. 3 illustrates determining relative position and other relative parameters of satellites according to some aspects. By way of reference, aspects are described herein with respect to ephemeris information. Ephemeris information gives coordinates of a celestial body at specific times during a given period. Ephemeris information is typically represented using seven parameters and LEO and GEO satellites may locate other satellites through inference or exchange of such information at block 160. These parameters are typically defined in the spherical polar coordinate system wherein most of the terms are expressed in terms of the angular distances. Five of the seven parameters (e.g., block 162, 164) define the orbital plane of each satellite, while the remaining two parameters (e.g., blocks 166, 168) help define the satellite position within the orbital plane at one specific reference time or epoch. Two-Line Elements (TLE) format is widely used to convey the satellite position information. Orbital plane parameters are relatively fixed for a specific satellite while the two satellite level parameters (e.g., blocks 166, 168) change over time and are exchanged more frequently.

Further for reference purposes and not meant to limit example aspects, to model the satellite position, a set of models referred to as simplified perturbation models collectively (e.g., Standard General Perturbation Satellite Orbit Model 4 (SGP4), Simplified Deep-space Perturbation Version 4 (SDP4), SGP8 and SDP8) are often used to calculate orbital state vectors of the satellites relative to the Earth-centered inertial coordinate system. In such models, different methods are used to account for drag and orbital decay and identify the satellite position. Once the position of the communicating satellite is determined, the position is used to deduce the azimuth, elevation and range (e.g., block 170) between the two satellites. This involves two angular distance calculations denoted as an azimuth angle and an elevation angle, apart from the range measurement. These calculations can be performed in Earth-Centered Earth-Fixed (ECEF) coordinates which can then be translated to different coordinate systems. Direction of the communication signal is calculated using the azimuth and the elevation angles. Velocity 172 is then calculated between the two satellites in North/East/Down (NED) frame of the satellite, and the direction information is combined to obtain the relative velocity 174. This relative velocity is used to deduce the expected Doppler shift 176 in the received signal, denoted as position based Doppler. This Doppler value is used by the LO Control Algorithm along with DSP tracked Doppler in order to adjust the clock (e.g., LO) and enable signal reception at the receiver as will be described in more detail later herein.

Point ahead angle is also considered in Doppler calculation to account for orbital motion of the satellites at a specific time instant in the future. Since the satellites communicate over distances of 2500 km or 5000 km for LEO-LEO links and even 45000 km for LEO-GEO links, latency of the signal transmission can be high, e.g., 8 ms or 16 ms or as high as 150 ms which impacts the position calculations and will be considered as necessary.

As mentioned above, Doppler shifts can create issues with communications between satellites or between satellites and stationary objects, because the shifted communication frequencies and can lead to error prone signal processing in the transceiver circuitry. Further large Doppler shifts are difficult to track and correct in high data rate optical systems, which employ blind methods. Aspects of the disclosure address these issues using methods and apparatuses describe below.

Methods and Circuitry for Doppler Correction

Figure 4:
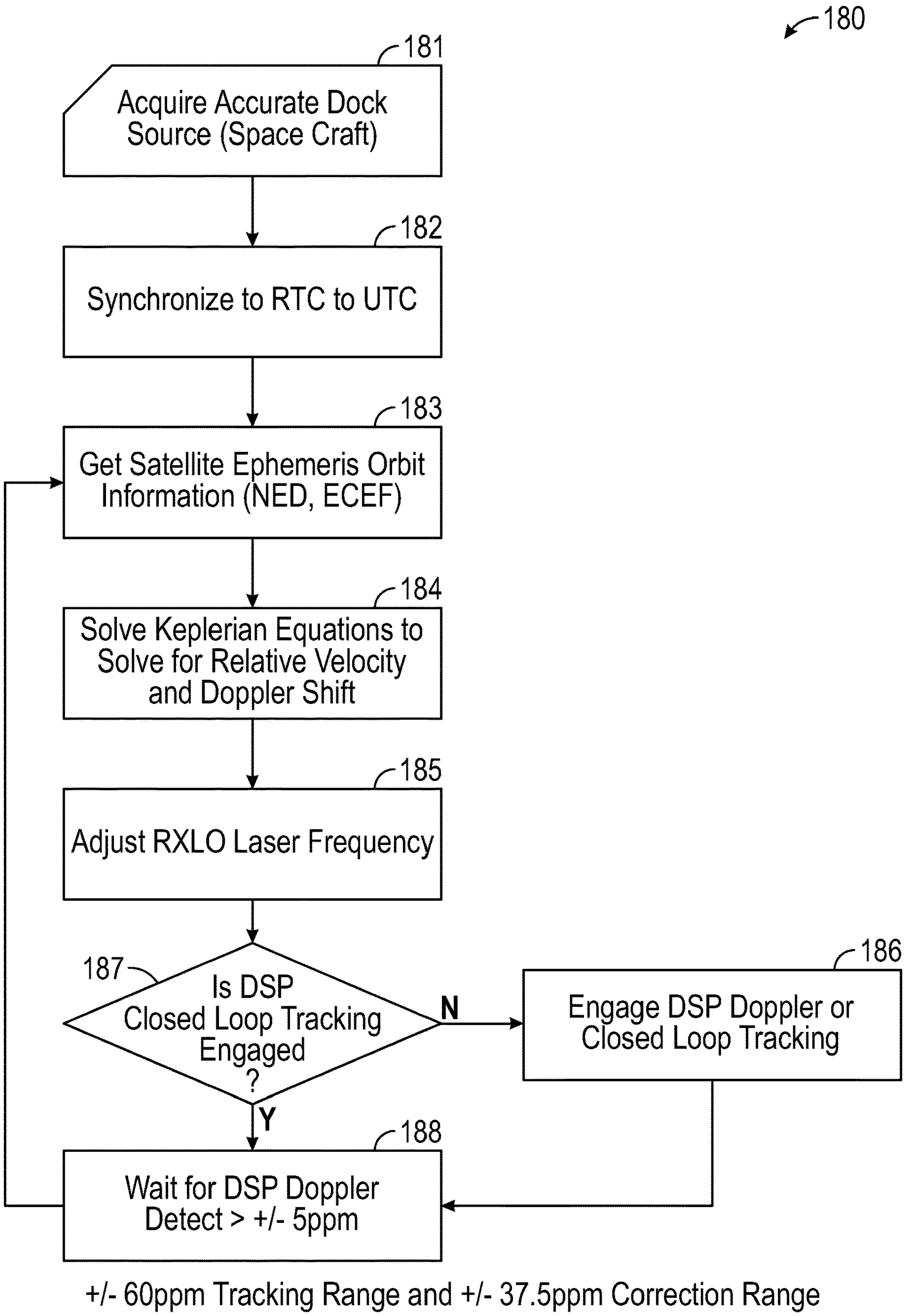
FIG. 4 illustrates initial Doppler calculation in accordance with some aspects.

Initial Doppler calculation can be performed in some examples according to a method 180 illustrated in FIG. 4. Initial Doppler calculation can be performed prior to methods according to aspects, or periodically (for example when satellites pass each other, or other examples) to enable signal reception.

In block 181, a local accurate clock source is obtained, and in block 182, the real time clock is synchronized with the local accurate clock. In block 183, satellite ephemeris information can be obtained at a specific time instant. Using the ephemeris vector of the host and the target satellites, relative velocity and Doppler shift can be calculated in block 184 as described above with reference to FIG. 3. These values can be used to adjust the receiver LO frequency with appropriate tune-ahead time at block 185. Since LO tuning takes time, tuning is initiated at a pre-calculated time to enable faster signal acquisition. Once signal reception is enabled, DSP Doppler tracking is enabled based on a threshold (e.g., +/−5 ppm) at block 186. This threshold is also used after enabling DSP Doppler tracking by filtering the DSP tracked Doppler and adjusting the LO periodically through LO tuning commands. This facilitates two stage Doppler tracking and correction in a loop according to blocks 186, 187 and 188, wherein a correction can be implemented by adjusting the LO center frequency and the residual offset handled through the closed loop DSP tracking algorithm.

Figure 5:
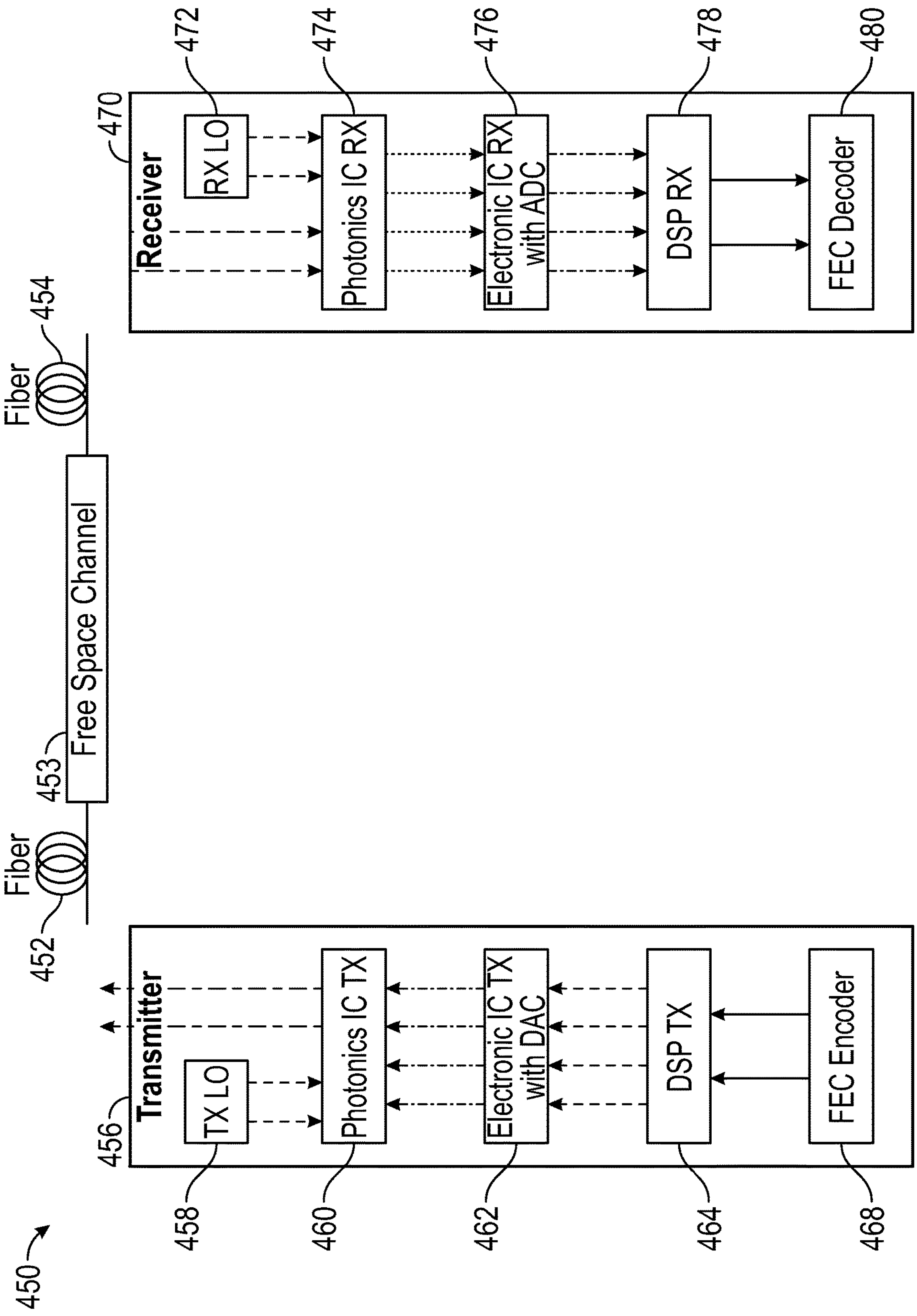
FIG. 5 illustrates a functional block diagram of coherent optical transceiver circuitry in accordance with some aspects.

FIG. 5 illustrates a functional block diagram of a coherent optical transceiver circuitry 450 in accordance with some aspects. The coherent optical transceiver circuitry 450 includes a transmit fiber 452 connecting the transmitter modem to an optical aperture, which transmits an optical signal over a free space channel 453, and a receiver fiber 454 forwards the signal from a receiver optical aperture to the receiver circuitry 470. A transmitter 456 includes a Forward Error Correction (FEC) encoder 468 to encode a bit stream, digital signal processing (DSP) circuitry 464 to frame, modulate and generate the transmit waveform, transmitter electronics (EIC) circuitry 462 to convert a digital signal to an analog signal, transmitter photonics (PIC) circuitry 460 to convert the electrical signal to optical signal, and laser source circuitry 458 to generate an optical signal. Receiver circuitry 470 includes laser source 472 to coherently combine the received optical signal, receiver photonics circuitry (PIC) 474 to convert a received optical signal to an electrical signal, receiver electronics circuitry (EIC) 476 to convert an analog signal to a digital signal, digital signal processing circuitry 478 to correct impairments and demodulate the bits and a FEC decoder circuitry 480 to decode a bit stream.

Figure 6:
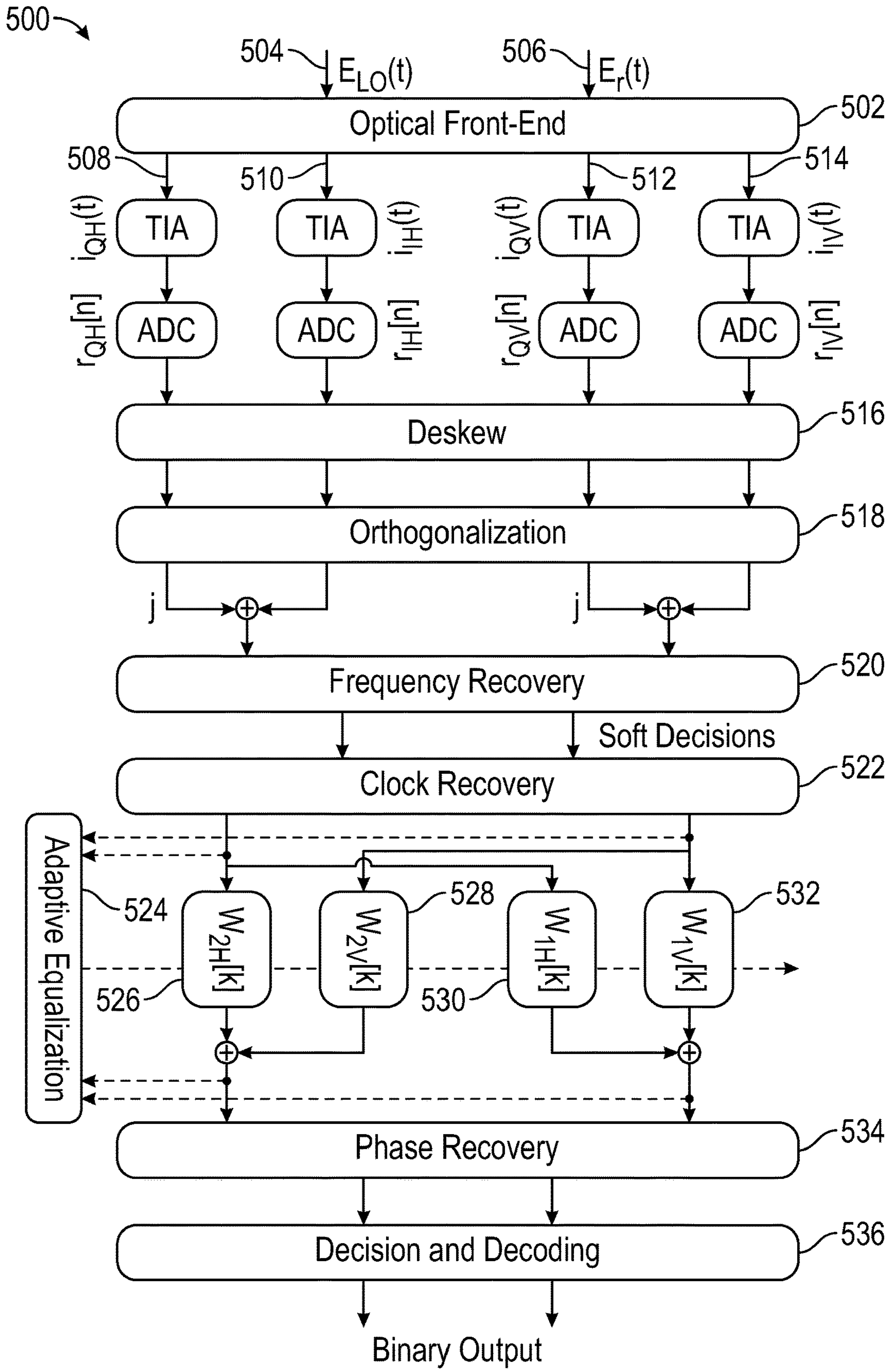
FIG. 6 illustrates a coherent optical receiver architecture in accordance with some aspects.

Correction, detection, etc. can be performed using circuitry described herein. FIG. 6 illustrates an architecture 500 in accordance with some aspects. Optical front-end 502 is part of the photonics circuitry that mixes the received optical signal 504, 506 with local oscillator (LO) signal at a certain frequency. Optical front-end 502 can provide electrical outputs 508, 510, 512, 514 after photodetection representing the in-phase and quadrature components for two polarizations to the Trans-impedance Amplifiers (TIA). Outputs of TIA are converted from Analog to digital using the ADC. Outputs 508, 510, 512, 514 can be provided to a deskew block 516 to correct the skew mismatches across the 4 streams. Outputs of deskew block 516 can be provide to an orthogonalization block 518 to orthogonalize the in-phase and quadrature components. Orthogonalization block 518 can provide outputs to frequency recovery 520 to track and correct the Doppler shifts in the received signal. Frequency recovery 520 can provide outputs to clock recovery 522 to correct the sampling clock offsets in the received signal. Adaptive equalization 524 can then be performed and blocks 526, 528, 530 and 532 can equalize the dual polarization received signal and remove inter-symbol interference or dispersion and provide output to phase recovery 534. Phase recovery 534 can estimate and correct for the carrier phase and provide output to decision and decoding 536. Decision and decoding 536 can demodulate the signal to provide binary output and soft decisions.

Doppler Tracking Based on Fast Fourier Transform (FFT)

As mentioned earlier herein, Doppler shift in communication frequency can significantly impair signal reception and processing, particular when the shift is very large as with inter-satellite optical communications. In terrestrial coherent fiber optic systems, Doppler shifts in the signal were typically low, in the order of 2 GHz or less. However, with inter-satellite optical links, Doppler tracking is a fundamental problem that needs superior performance and hardware efficient design. Furthermore, systems may not resolve issues with Doppler tracking in optical inter-satellite links with pointing induced fading. Some terrestrial optical DSP solutions for Doppler tracking involve methods involving Fast Fourier Transform (FFT) or correlation and a very complex ambiguity search technique, which does not provide sufficient capture range in addition to being very complex. Finally, most terrestrial use cases do not include abrupt Doppler changes and cannot be adaptable to systems in which many orbits and constellations must be accounted for (as in satellite communications).

Aspects of the disclosure address these and other concerns by providing a closed loop Doppler tracking system and various methods to enable a wide capture range of +/−13 GHz Doppler (or even greater) with position based local oscillator adjustment and closed loop tracking in the DSP (e.g., the DSP TX 464 or DSP RX 478 described above). Position based Doppler estimates are used in the initial acquisition mode and later for periodic LO adjustments. In example aspects, Doppler tracking is performed using a blind M-th power technique and centering the spectrum using FFT. In at least one aspect, phase ambiguities inherent to the M-th power methods are efficiently resolved using an additional FFT or time domain filtering. Periodic local oscillator (LO) adjustment helps in ensuring reasonable performance of the analog-to-digital (ADC) and the receiver frontend. Doppler residuals are then corrected as part of the DSP receiver chain. Rapid Doppler fluctuations over low ranges are handled through such DSP tracking, while two lasers are provisioned for handling such fluctuations over large ranges of Doppler. The techniques are applicable to several optical or other wireless communication systems experiencing large Doppler shifts.

Figure 7:
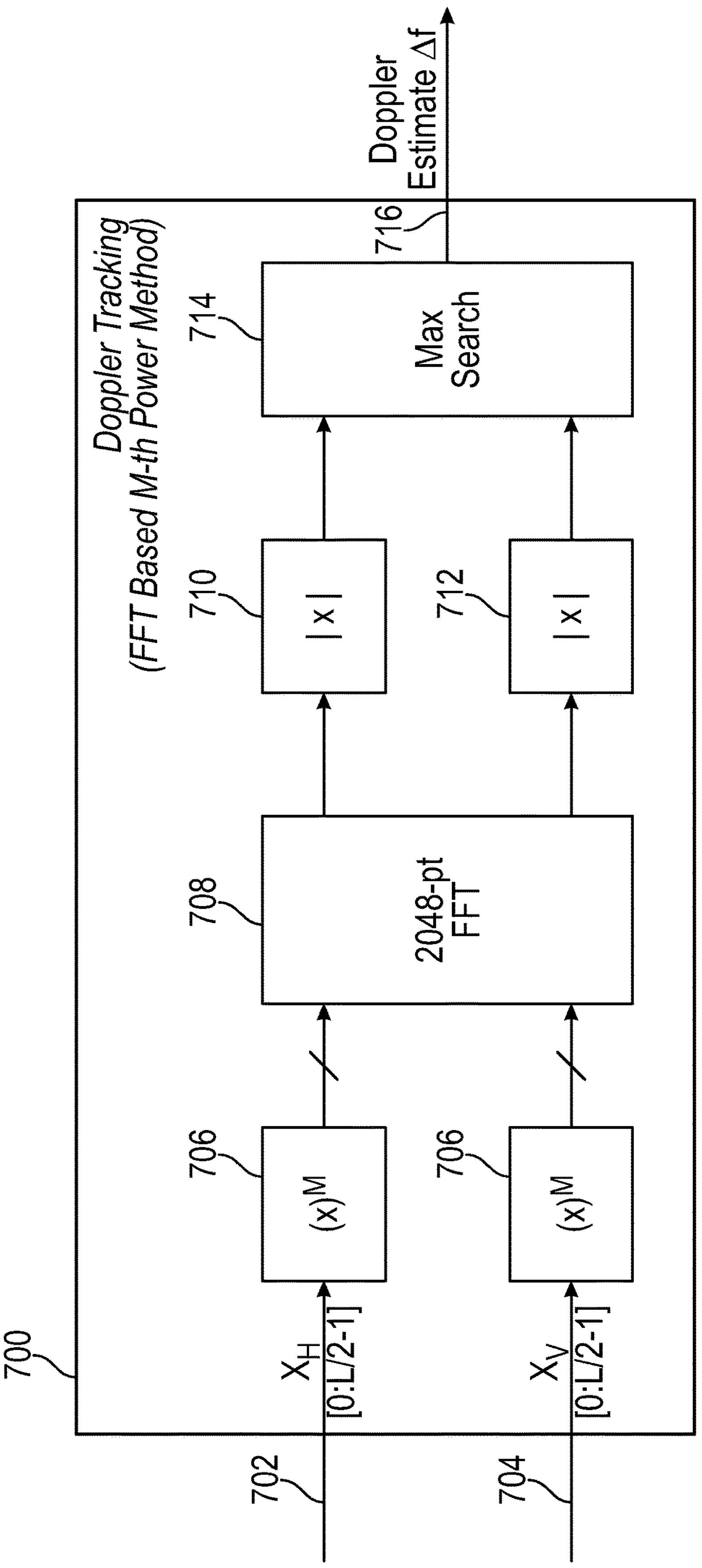
FIG. 7 illustrates a block diagram of an implementation of a system for Doppler tracking in accordance with some aspects.

FIG. 7 illustrates a block diagram of an implementation of a system 700 for Doppler tracking in accordance with some aspects. Circuitry described with reference to FIG. 7 can be included in a DSP, and incorporated within for example, a satellite 102, 104 of FIG. 1, or of any control circuitry for controlling according to aspects described above, or for communicating with any of the satellites 102, 104.

In one aspect, closed loop DSP Doppler tracking is performed based on M-th power operation and FFT with wide capture range as described later herein. Doppler tracking in the DSP can be performed periodically with a programmable update interval for orbits with smooth varying Doppler. The update interval is typically chosen based on the rate of change of Doppler, but could also factor channel coherence time e.g., 0.5 ms. For handling rapid Doppler fluctuations such as a sign change (e.g., when satellites pass each other so that distance changes from a negative to a positive number), DSP tracking periodicity can be reduced such that tracking happens more often (e.g., on the order of tens of microseconds). In some examples, a fraction (e.g., 10% or less) of received samples are used for the Doppler estimation using the received signal in both polarizations.

M-th power operation can first be performed on the received signals 702, 704 at block 706 based on the modulation order. This operation can be performed to remove the modulation phase from the signal before FFT is performed at block 708 and transform all samples to the first quadrant in the complex plane. For example, in a Quadrature Phase Shift Keying (QPSK) modulation scheme according to some standards (e.g., the OpenZR standard), M can be set to 4. Similarly, according to a binary phase shift keying (BPSK) modulation scheme, M can be set as 2. Some other examples include on-off keying (OOK) and pulse position modulation (PPM) modulation schemes in the Space Development Agency (SDA) standard and differential phase shift keying (DPSK) in the Laser Communications Relay Demonstration (LCRD) specification, M is set to 1 which translates to bypassing the power M operation.

N-point FFT is performed at block 708 to convert the signal to frequency domain. In some aspects, the value for N may depend on the standard and/or modulation schemes involved. For example, N can be set to 2048 for all OpenZR standard configurations where the sampling rate is 45-50 Gsps and N can be chosen as 1024 for various LCRD and SDA configurations where the sampling rate is 22-25 Gsps. The chosen N values can correspond to a Doppler precision of ~24 MHz (or 0.15 ppm) regardless of the standards and baud rates used. It can be noted that N can be chosen as 512 or 4096 leading to different Doppler precision. Received signals 702, 704 from a number of clock cycles (e.g., 32 or 64 clock cycles) can be used, or 16 or 32 samples could be processed in parallel in each clock cycle. Power meter circuitry 710, 712 can calculate the power spectral density over the N frequency bins.

In block 714, a search, (e.g., binary search) can be performed to identify the peak frequency bin, which would then denote the Doppler shift index 716 in the range $-N/2$ to $N/2-1$, wherein the Doppler shift index 716 can comprise an estimate (e.g., a "Doppler estimate"), which can then be stored using log 2(N) bits and passed to the Doppler correction block.

In aspects, for cases of received signals using an SDA standard and/or OOK/PPM modulation schemes, M is set to 1 and Doppler correction is performed directly using the Doppler shift index 716, without any additional phase ambiguity calculation. The peak frequency bin is then passed as one of the outputs used to deduce the Doppler to be corrected. In all other modulation schemes and standards where M is not 1, additional phase ambiguity correction is necessary and a separate block for ambiguity calculation is employed as described below with respect to FIG. 8 and FIG. 10.

Doppler precision can be about 24 MHz for cases with FFT size being either 1024 or 2048 or even higher (e.g., 4096, 8192, etc.). Doppler tracking periodicity can be set in an exemplary range of 475-525 microseconds and depending upon the frame duration, tracking is performed once for every 'K frames' wherein K is chosen based on the specific standard. Doppler changes may be about only 20-120 MHz per second except for scenarios with abrupt sign changes (e.g., when the devices or satellites pass each other). Because the Doppler precision is roughly 22-25 MHz, repeating Doppler estimation does not improve accuracy or other operations because performing multiple FFTs in the processing circuitry (e.g., DSP circuitry described herein) would return the same frequency bin index. Accordingly, the periodicity factor K can be chosen primarily based on the channel coherence time. With pointing induced fading, the root mean squared (rms) vibrational frequency will be roughly 100 Hz, which corresponds to a fading coherence time of 0.5-1 millisecond (ms). Therefore, Doppler estimation is performed according to aspects of the disclosure once or twice within the coherence time of about 1 ms. In certain LEO constellations, it may be possible to further reduce this periodicity, to improve power savings.

Figure 8:
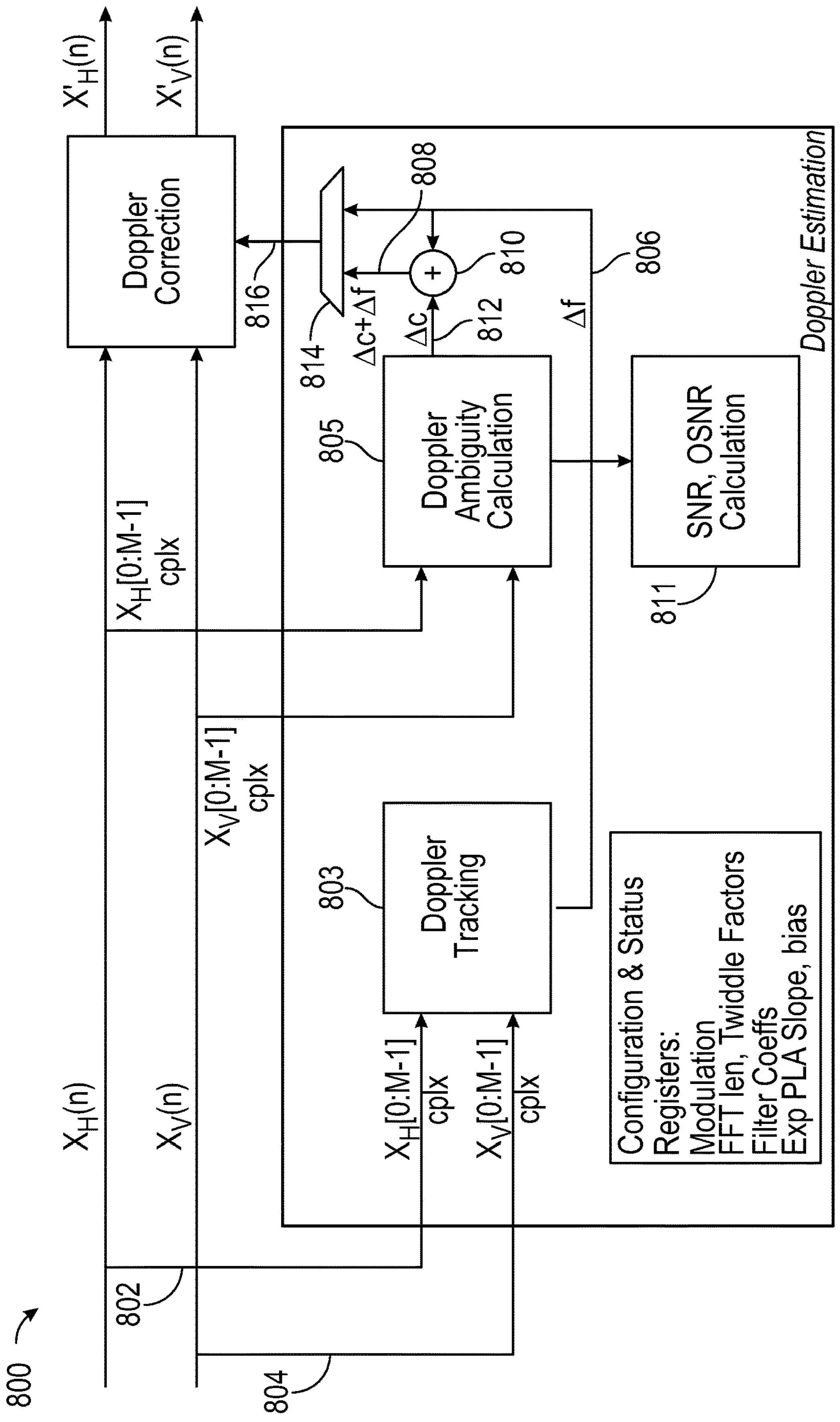
FIG. 8 illustrates Doppler estimation blocks according to some aspects.

FIG. 8 illustrates Doppler estimation blocks 800 according to some aspects. As seen in FIG. 8, Doppler tracking 803 is provided and can be similar to that describe above with respect to FIG. 7. An ambiguity calculation block 805 can be employed for modulation schemes where M is not set as 1. Doppler can then be deduced either directly from the Doppler tracking 803 or by combining the tracking output 806 with ambiguity correction 808 at block 814. For example, at block 810, Doppler correction 816 can be based on ambiguity calculation 812 in addition to tracking output 806 based on modulation schemes, e.g., only ambiguity calculation may be used for OOK/PPM, while both the tracking output 806 and the ambiguity calculation 812 may be used for BPSK and QPSK modulation schemes. In some aspects, the FFT used in ambiguity or tracking blocks can be reused for signal-to-noise (SNR) and optical SNR (OSNR) calculations in block 811.

Doppler Ambiguity Calculation

In aspects, and as briefly mentioned earlier herein (specifically with respect to FIG. 8, ambiguity calculation block 805), Doppler ambiguity calculation can be performed to deduce and remove phase wraps (wherein a phase offset is understood to be constrained to the range $-180$ degrees $\leq$ Phase Offset $<180$ degrees and exceeding this is referred to as "wrapping"). Phase wraps arise in Doppler calculation of coherent optical systems, due to the M-th power operation on the received signal. With M-th power operation, Doppler range reduces to just $-Fs/2M$ to $+Fs/2M$, wherein $M=4$ for QPSK and Fs is the sampling rate which could be 50 Gsps. For any higher frequencies, phase estimates get wrapped, limiting the ability to track Doppler. By removing such phase wraps, the Doppler capture range can be increased. In scenarios with $M>1$, phase ambiguity calculation can be performed in accordance with some aspects described below. Phase ambiguity can be performed in some aspects using either a frequency domain approach or a time domain filtering approach.

Figure 9:
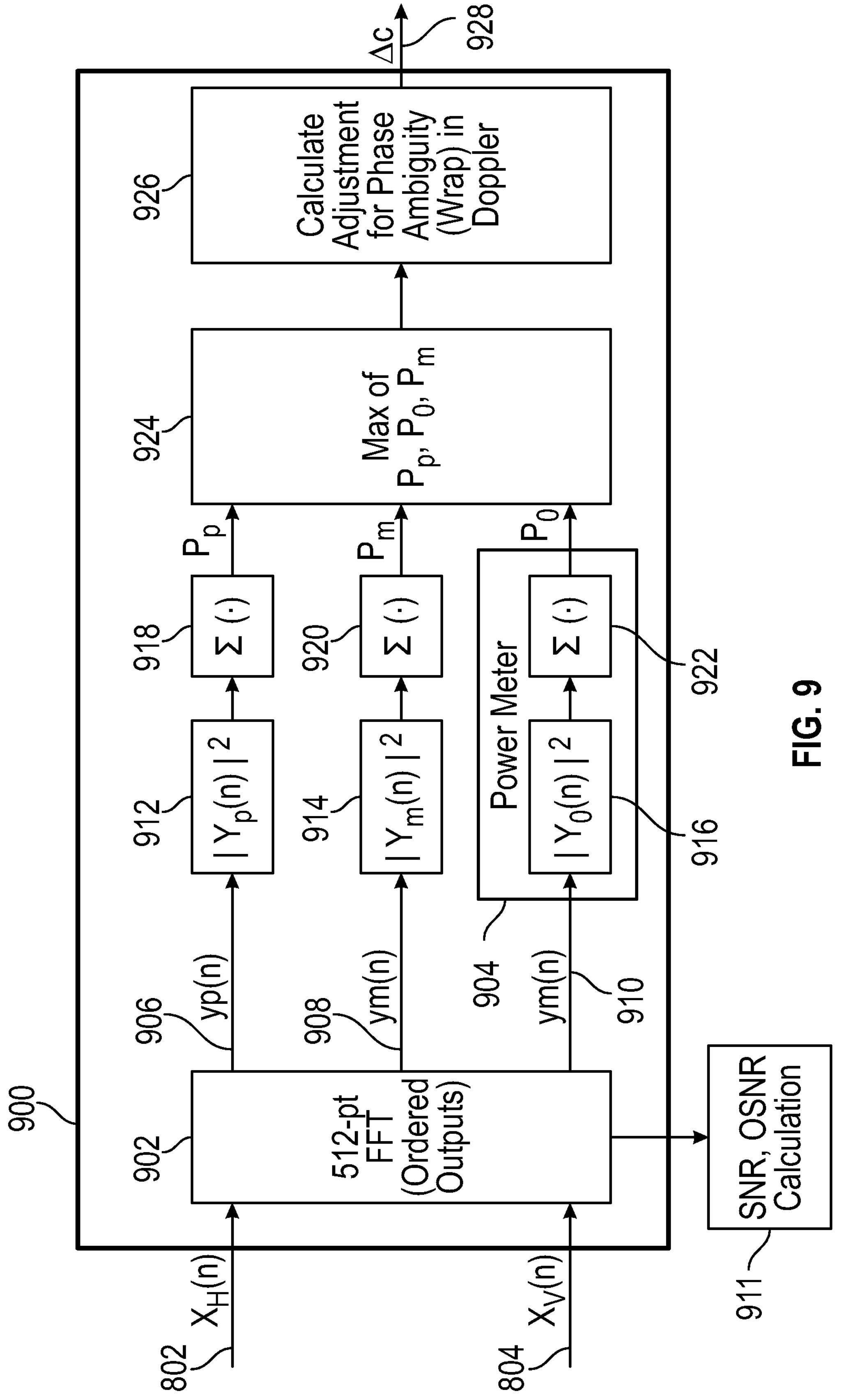
FIG. 9 illustrates a frequency domain approach to Doppler ambiguity calculation in accordance with some aspects.

FIG. 9 illustrates a frequency domain approach to Doppler ambiguity calculation according to some aspects. In aspects the approach can perform functionality similar to Doppler Ambiguity Calculation 805 (FIG. 8). In aspects implementing a frequency domain approach, a smaller sized FFT (e.g., N=512 or lower) 902 is first performed on the received signal 802, 804. Output of FFT 90 can be provided to signal-to-noise ratio (SNR) and optical SNR (OSNR) block 911.

Circuitry 904 can measure power on different parts of the spectrum estimated using outputs 906, 908, 910 of the FFT 902. For example, a number of windows (e.g., three windows in the illustrated example) are defined depending on the standard used and the baud rate of the communications. These three windows represent a Doppler ambiguity of −Fs/2, 0 and Fs/2 which can then be added as an offset to the tracked Doppler. In the case of much lower baud rates, five windows can be defined, representing Doppler ambiguity of −Fs/2, −Fs/4, 0, Fs/4 and Fs/2. It can be noted that any number of windows can be used, although three and five may be the most common for baud rates considered in the range of 1-33 Gsps and sampling rate of 45-50 Gsps.

Power within the three or five different frequency domain windows 912, 914, 916 are summed at blocks 918, 920, 922 with equal number of frequency bins. These are denoted as $P_p$, $P_m$, $P_0$ in FIG. 9. Circuitry can deduce the phase ambiguity based on the maximum of the power across these windows at block 924. In block 926, adjustment is calculated (e.g., adjustment for phase ambiguity or wrap in the Doppler). For example, the block 926 can use a combination of the tracked Doppler from previous circuitry described above with reference to FIGS. 7-8 and an additional offset 928 to correct for the phase ambiguity. Calculations for system 900 can be performed periodically with a similar periodicity as described above with reference to FIG. 7-8.

Figure 10:
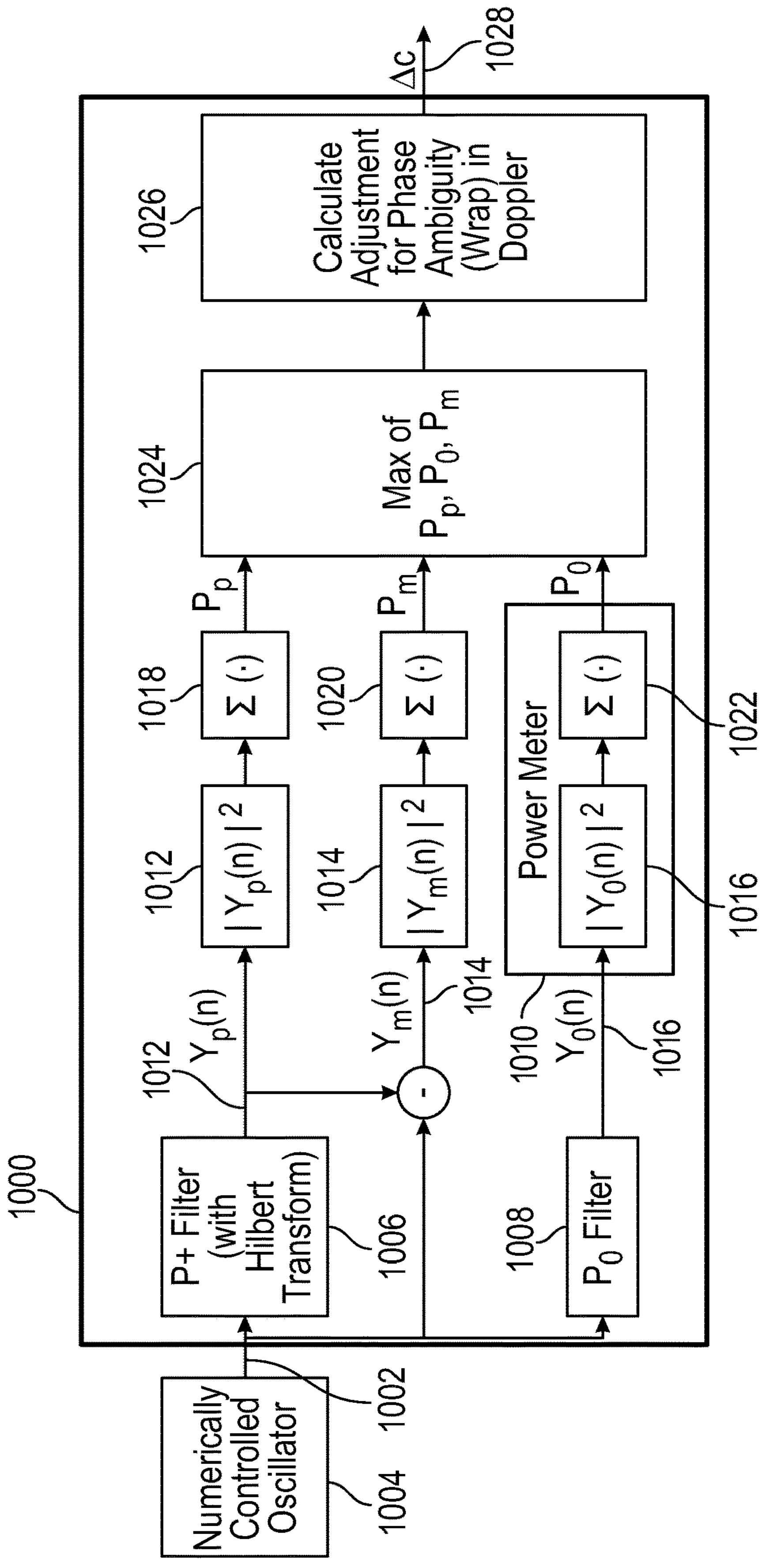
FIG. 10 illustrates a time domain approach to Doppler ambiguity calculation in accordance with some aspects.

In still other aspects, apparatuses and methods can utilize a time domain approach for performing phase ambiguity calculation. FIG. 10 illustrates a time domain approach to Doppler ambiguity calculation according to some aspects. In these aspects, a received signal 1002 is first rotated with a Numerically Controlled Oscillator (NCO) 1004 to correct the Doppler tracked using the M-th power and FFT operations of previous blocks described in more detail earlier herein with reference to FIG. 7-9.

In aspects, filters 1006, 1008 can be used to filter the received signal after NCO rotation 1002. Filters 1006, 1008 can comprise polyphase filters that correspond to extracting the signal in different windows of the signal in the frequency domain. In an exemplary scenario with three windows, these correspond to three frequency ranges of [−Fs/2 to 0], [−Fs/4 to Fs/4] and [0 to Fs/2] wherein Fs is the sampling frequency, and wherein windows were introduced above with reference to FIG. 9. Polyphase filter length can be programmable.

As described with reference to FIG. 9, circuitry 1010 can measure power on different parts of the spectrum estimated using outputs 1012, 1014, 1016 of the filters 1006, 1008. For example, a number of windows (e.g., three windows in the illustrated example) are defined depending on the standard used and the baud rate of the communications. These three windows represent a Doppler ambiguity of −Fs/2, 0 and Fs/2 which can then be added as an offset to the tracked Doppler. In the case of much lower baud rates, five windows can be defined, representing Doppler ambiguity of −Fs/2, −Fs/4, 0, Fs/4 and Fs/2. It can be noted that any number of windows can be used, although three and five may be the most common for baud rates considered in the range 1-33 Gsps and sampling rate of 45-50 Gsps.

Power within the three or five different frequency domain windows 1012, 1014, 1016 are summed at blocks 1018, 1020, 1022 with equal number of frequency windows. These are denoted as $P_p$, $P_m$, $P_0$ in FIG. 10. Circuitry can deduce the phase ambiguity based on the maximum of the power across these windows at block 1024. In block 1026, similarly to the frequency domain approach described above with reference to FIG. 9, adjustment is calculated (e.g., adjustment for phase ambiguity or wrap in the Doppler). For example, the block 1026 can use a combination of the tracked Doppler from previous circuitry described above with reference to FIGS. 7-8 and an additional offset 1028 to correct for the phase ambiguity. Calculations for system 1000 can be performed periodically with a similar periodicity as described above with reference to FIG. 7-8.

In examples, a frequency domain approach may use less power and be less complex relative to the time domain approach due to the additional NCO circuitry 1004 used in the time domain approach.

In aspects, circuitry (e.g., DSP circuitry or some component thereof or other components of systems described with reference to FIG. 1-9) can perform Doppler correction using the received signal on the main path, accounting for the tracked Doppler and the phase ambiguity values. Doppler correction circuitry can include an NCO block that calculates the rotation factors using sine and cosine lookup tables or based on a coordinate rotational digital computer (CORDIC) algorithm. The frequency window indices can be estimated using the Doppler schemes and the phase ambiguity can be calculated using circuitry blocks and system flows as described above. By continuous periodic operation of the NCO throughout the lifetime of vehicles and devices using apparatuses according to aspects of the disclosure, spectrum centering can be performed for continuous accurate transceiver operation. In the exemplary case of 2048 FFT size in the Doppler tracking block, log 2(2048)=11 bits are sufficient to denote the tracked Doppler and 2 bits are sufficient to denote the Doppler ambiguity calculated as +1,0,−1 (representing −Fs/2, 0, Fs/2). On the other hand for a 1024 FFT size in the Doppler tracking block, 10 bits are sufficient for denoting the tracked Doppler and 12 total bits can be sent from the Doppler estimation to the correction block.

LO Adjustment and Control

It can be noted that the DSP can have a large capture range of, e.g., −13 GHz and +13 GHz, but a limited correction capability. This is because the ADC bandwidth could be limited to roughly 45-50 Gsps, and so, DSP correction capability could be limited to approximately 38 ppm (+/−7.5 GHz) and the remaining Doppler can be corrected through periodic LO adjustment based on adjustment values calculated according to example aspects.

In an exemplary embodiment, Doppler correction is performed in two stages, a first correction using a LO adjustment either periodically or based on a DSP threshold comparison; and a second correction in the DSP transceiver circuitry using NCO as described above. Doppler tracked in the DSP can be filtered through a first order recursive filter with a factor, for example β=0.8. The filtered doppler value can be compared with previous Doppler estimates and the result can be used to apply a LO adjustment based on a threshold (e.g., 1 GHz or 5 ppm). In some aspects, for every 1 GHz change (for example) in the filtered Doppler value, an LO tuning command can be generated that will facilitate retuning of the LO center frequency. This enables tracking smooth or slow varying Doppler variations due to the orbital motion of the satellites and ensures that most of the Doppler correction is performed through LO adjustments. In the case of periodic LO adjustment, periodicity of the LO adjustments can be designed based on the LO tuning speed and range.

Doppler Periodicity and Fading

In aspects of the disclosure, Doppler tracking is performed periodically with a period based on the expected Doppler fluctuations calculated using the satellite orbit parameters of the two satellites or the positions of two mobile devices. In satellites, pointing jitter due to satellite vibration causes intensity fluctuations in the form of fading. Fading could also arise in other wireless environments impacting the signal levels. Since fading impacts the SNR in the signal, Doppler tracking performance is sensitive to fade levels. Therefore, in aspects of the disclosure, Doppler tracking is performed only when measured signal levels are above a programmable threshold. During fades with low signal levels, Doppler measurements are avoided and delayed until signal level increases above a certain threshold. This helps in ensuring sufficient SNR when Doppler tracking is performed. Further, periodicity of Doppler tracking is deduced from the channel coherence time (e.g., 0.5-1 ms), that enables effective continuous tracking.

SNR or OSNR Measurement, and Dual Polarization

Figure 11:
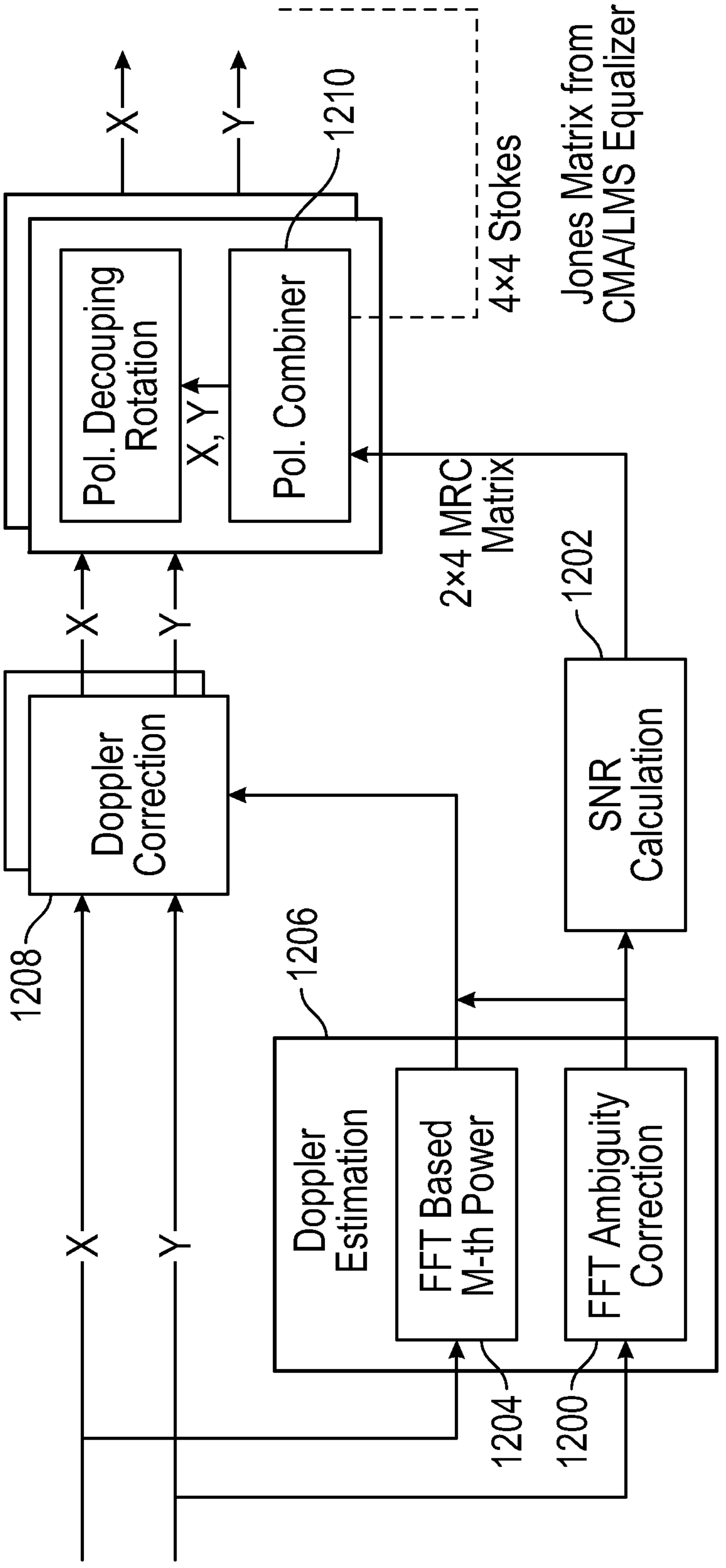
FIG. 11 illustrates optical signal to noise ratio and signal to noise ratio calculations in accordance with some aspects.

In other aspects of the disclosure, the FFT used in the Doppler tracking and the ambiguity calculation blocks as described earlier herein with reference to FIG. 8-11 can be reused to calculate the in-band and the out-of-band power and deduce the SNR as shown in FIG. 11. For OpenZR and LCRD standards, a 512-point FFT 1200 used for Doppler ambiguity calculation can be reused for calculating the SNR 1202 per polarization. For communications based on the SDA standard, 1024-point FFT 1204 in the M-th power based Doppler tracking block can be reused for SNR calculation, since ambiguity calculation is not performed. Regardless of the standard used, in-band power and out-of-band power can be calculated using appropriate frequency windows from the 512 or 1024 point FFT, after Doppler correction. For example, in the case of 512 point FFT, fifty (50) frequency bins in the band center could be used for in-band power calculation and 25 frequency bins in each of the two band edges could be used for out-of-band power calculation. The ratio of the in-band and the out-of-band power values can be used to calculate the SNR per polarization. OSNR can be deduced from the SNR values for the two polarizations with appropriate baud rate considerations.

Doppler estimation and correction can occur as described above with reference to FIG. 7-10 in blocks 1206, 1208, respectively. When dual polarization is used at block 1210, a Jones matrix or Stokes parameters based polarization decoupling could be performed either before or after Doppler tracking, based on an input from an equalizer circuitry that express the polarization state of the inputs to block 1210. This reduces the polarization mode coupling and improves Doppler tracking performance. Further, in the case of single polarization waveforms, power measurements in the received signal or SNR measured in the two polarizations can be used to combine the two signals in a Maximum Ratio Combining (MRC) fashion to form the single polarization signal, while maximizing the effective SNR. Doppler tracking after such MRC combining of the dual polarization signals can improve the tracking performance.

Abrupt Sign Flips in Doppler

In numerous optical inter satellite links, the Doppler can vary smoothly over time while in other links, there could be a sudden sign flip due to a change in the relative direction of the two satellites. In some examples, satellites can approach each other causing the Doppler to flip signs as the satellites move towards each other and after one specific crossing instant, move past one another in opposite directions. In these scenarios, an LO control algorithm can provide a notification to the DSP to expect and account for sign flips in forthcoming frames based on the position-based Doppler. DSP circuitry can increase the Doppler tracking periodicity and identify the specific frame with sign flips. LO retuning can be initiated to adjust for the sign flip. However, calculations for handling sign flips over large Doppler ranges can be challenging.

To address these and other concerns, aspects of the disclosure can provide dual (e.g., primary and auxiliary) lasers to extend the range over which Doppler sign flips can be handled. When the satellites in such cases approach each other, one of the two lasers (e.g., the auxiliary laser) would be powered on and tuned to a frequency with a Doppler adjustment accounting for the sign flip. When the DSP tracking detects sign flip in Doppler when the satellites cross one another, the second (e.g., auxiliary) laser becomes operational and used in the photonics circuitry, and the primary laser is turned off. This ping-pong mechanism can be used to swap between the two lasers over the two hemispheres as the satellites orbit around the earth. Sign changes over the full Doppler capture range of −13 GHz to +13 GHz can be accounted for and adjusted for, including abrupt sign flips in the Doppler.

Aspects have been described herein with respect to inter-satellite communications but can also be applied for communications between any devices. In particular, when at least one device of two devices in communication is mobile, Doppler shift can affect communications between devices. As such, aspects can apply to any high data rate communication systems where Doppler range is large and blind methods are employed needing M-th power and FFT based approaches. While aspects are described with respect to coherent optical systems, they can also be applied for other wireless systems where large Doppler tracking range is needed.

Other Systems and Apparatuses

Figure 12:
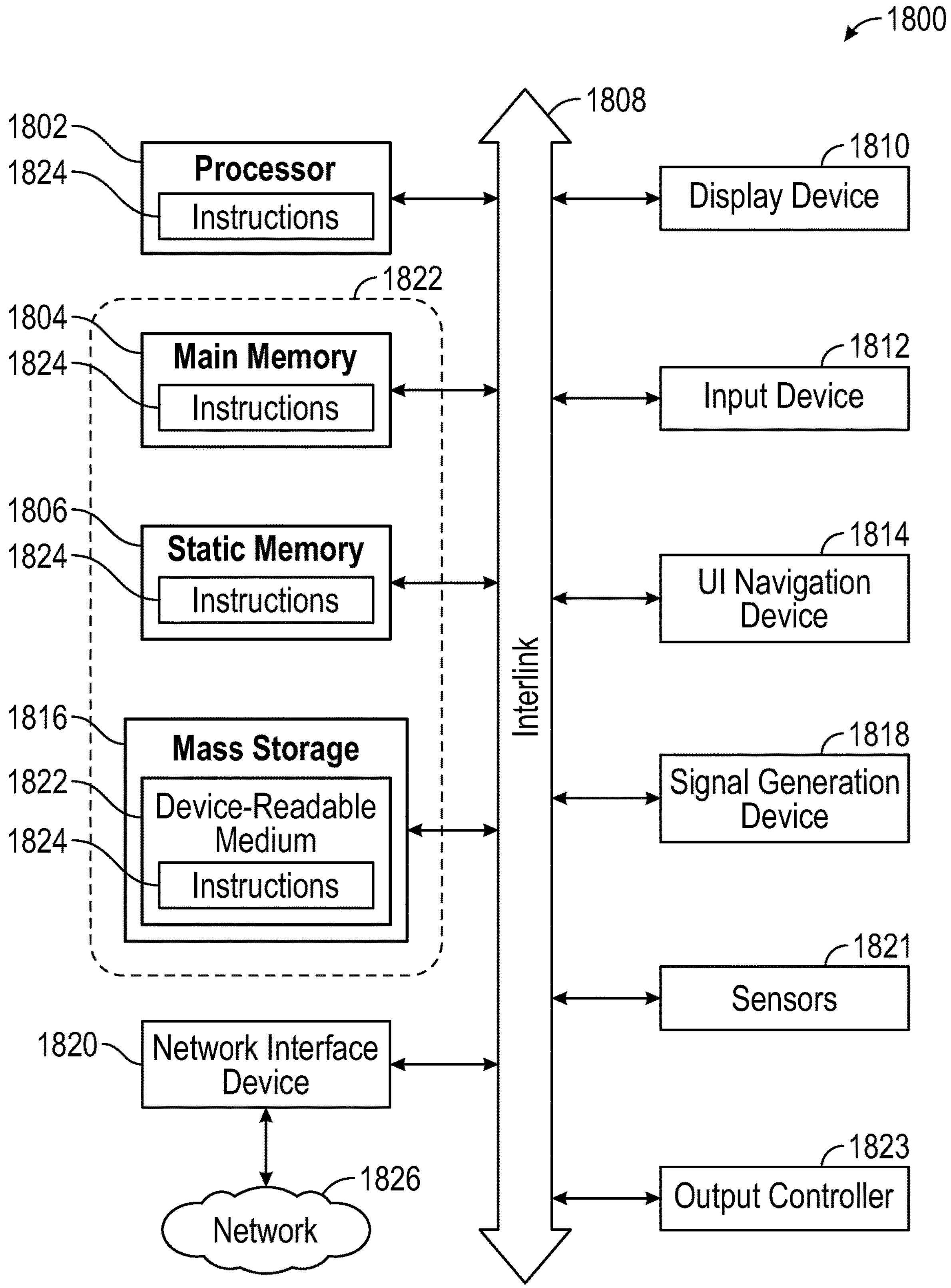
FIG. 12 illustrates a block diagram of a compute device in accordance with some aspects.

FIG. 12 illustrates a block diagram of a computing device 1800 that can be included in, for example, a satellite 102, 104 of FIG. 1, or of any control circuitry for controlling according to aspects described above, or for communicating with any of the satellites 102, 104. In alternative aspects, the communication device 1800 may operate as a standalone device or may be connected (e.g., networked) to other communication devices. In some aspects, the communication device 1800 can use one or more of the techniques and circuits discussed herein, in connection with any of FIG. 1-FIG. 11.

In several aspects, the methods, design and circuitry described are used in coherent optical transceivers built for satellites to enable inter satellite optical links with high data rates of 100 Gbps or beyond.

In some aspects, inter satellite optical links refer to optical communication links between two satellites within the Low earth orbit (LEO) or between a Low earth orbit (LEO) satellite and a Geo-stationary earth orbit (GEO) satellite. Satellites may convey their ephemeris information to other satellites through suitable control interfaces. Ephemeris information may be in Two Line Elements (TLE) format with 5 parameters denoting the orbital plane parameters and 2 parameters denoting the satellite level parameters.

A coherent optical transceiver may consist of a photonics circuitry, data converters, baseband DSP circuitry, FEC encoder and decoder, and a serial interface. Photonics circuitry is used to convert an electrical signal to an optical signal at the transmitter, and an optical signal to an electrical signal at the receiver. Photonics circuitry may further include a laser source both at the transmitter and the receiver. In coherent optical transceivers, the received optical signal is mixed with a local laser source to decode the signal, that enables both amplitude and phase modulation as well as polarization multiplexing. Data converter circuitry involves a Digital-to-Analog (DAC) converter at the transmitter and an Analog-to-Digital (ADC) converter at the receiver with appropriate sampling rates. Baseband DSP circuitry is used to modulate a signal at the transmitter and demodulate the signal at the receiver based on the waveform, standard and baud rates. Forward error correction (FEC) encoder at the transmitter and FEC decoder at the receiver helps in adding redundancy to reliably decode a bit stream. A serial bit interface is used to format, send or receive the bit stream at the transmitter and the receiver, respectively.

Photonics circuitry may use Mach-Zehnder modulators (MZM) at the transmitter to optically modulate the amplitude and phase based on the modulation scheme. At the transmitter, the photonics circuitry may send the signal either over a single mode fiber (SMF) or a polarization maintaining fiber (PMF) to the optical aperture, which transmits the laser signal over a free space channel. Photonics circuitry may use an Optical front-end with structures called Hybrid 90 at the receiver to mix the received optical signal with a local laser source and generate 4 streams of signals corresponding to the in-phase and quadrature components for the two polarizations. These 4 signals may then be fed to balanced photodiodes for photodetection and amplified further by a Trans-Impedance Amplifier (TIA). ADC circuitry may then convert the analog signal to digital for baseband processing.

Laser source may be tunable in the C-band wavelength range of 1530-1565 nm corresponding to frequency range of roughly 191-196 THz.

Baseband DSP circuitry may support waveforms according to various optical standards such as i) OpenZR+ standard used in fiber optic systems with dual polarization and modulation schemes such as QPSK, 8QAM and 16QAM, ii) Digital Video Broadcasting standard DVB-S2 with several modulation schemes, iii) NASA developed standard for Lunar Communication Relay Demonstration (LCRD) employing a custom Differential PSK (DPSK) waveform with DVB-S2 FEC, iv) Space Development Agency (SDA) standard with OOK based modulation schemes.

Circuitry (e.g., processing circuitry) is a collection of circuits implemented in tangible entities of the device 1800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1800 follow.

In some aspects, the device 1800 may operate as a standalone device or may be connected (e.g., networked) to other devices. In a networked deployment, the communication device 1800 may operate in the capacity of a server communication device, a client communication device, or both in server-client network environments. In an example, the communication device 1800 may act as a peer communication device in peer-to-peer (P2P) (or other distributed) network environment. The communication device 1800 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Computing device 1800 may include a hardware processor 1802 (e.g., a central processing unit (CPU), a graphics processing unit (GPU), a hardware processor core, or any combination thereof), a main memory 1804, a static memory 1806, and mass storage device 1816 (e.g., hard drive, tape drive, flash storage, or other block or storage devices), some or all of which may communicate with each other via an interlink (e.g., bus) 1808.

The communication device 1800 may further include a display unit 1810, an alphanumeric input device 1812 (e.g., a keyboard), and a user interface (UI) navigation device 1814 (e.g., a mouse). In an example, the display unit 1810, input device 1812 and UI navigation device 1814 may be a touch screen display. The communication device 1800 may additionally include a signal generation device 1818 (e.g., a speaker), a network interface device 1820, and one or more sensors 1821, such as a global positioning system (GPS) sensor, compass, accelerometer, or another sensor. The communication device 1800 may include an output controller 1823, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1816 may include a communication device-readable medium 1822, on which is stored one or more sets of data structures or instructions 1824 (e.g., software) embodying or utilized by any one or more of the techniques or functions described herein. In some aspects, registers of the processor 1802, the main memory 1804, the static memory 1806, and/or the mass storage device 1816 may be, or include (completely or at least partially), the device-readable medium 1822, on which is stored the one or more sets of data structures or instructions 1824, embodying or utilized by any one or more of the techniques or functions described herein. In an example, one or any combination of the hardware processor 1802, the main memory 1804, the static memory 1806, or the mass storage device 1816 may constitute the device-readable medium 1822.

As used herein, the term “device-readable medium” is interchangeable with “computer-readable medium” or “machine-readable medium.” While the communication device-readable medium 1822 is illustrated as a single medium, the term “communication device-readable medium” may include a single medium or multiple media (e.g., a centralized or distributed database, and/or associated caches and servers) configured to store the one or more instructions 1824.

The term “communication device-readable medium” may include any medium that is capable of storing, encoding, or carrying instructions for execution by the communication device 1800 and that cause the communication device 1800 to perform any one or more of the techniques of the present disclosure, or that is capable of storing, encoding, or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 1824 may further be transmitted or received over a communications network 1826 using a transmission medium via the network interface device 1820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1820 may include one or more physical jacks (e.g., Ethernet, coaxial, or phone jacks) or one or more antennas to connect to the communications network 1826. In an example, the network interface device 1820 may include a plurality of antennas to wirelessly communicate using at least one of single-input multiple-output (SIMO), MIMO, or multiple-input single-output (MISO) techniques. In some examples, the network interface device 1820 may wirelessly communicate using Multiple User MIMO techniques.

The term “transmission medium” shall be taken to include any intangible medium that is capable of storing, encoding, or carrying instructions for execution by the communication device 1800, and includes digital or analog communications signals or other intangible medium to facilitate communication of such software. In this regard, a transmission medium in the context of this disclosure is a device-readable medium.

Discussions herein utilizing terms such as, for example, “processing”, “computing”, “calculating”, “determining”, “establishing”, “analyzing”, “checking”, or the like, may refer to operation(s) and/or process(es) of a computer, a computing platform, a computing system, or other electronic computing device, that manipulate and/or transform data represented as physical (e.g., electronic) quantities within the computer’s registers and/or memories into other data similarly represented as physical quantities within the computer’s registers and/or memories or other information storage medium that may store instructions to perform operations and/or processes.

The terms “plurality” and “a plurality”, as used herein, include, for example, “multiple” or “two or more”. For example, “a plurality of items” includes two or more items.

References to “one aspect”, “an aspect”, “an example aspect,” “some aspects,” “demonstrative aspect”, “various aspects” etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to and are not intended to imply that the objects so described must be in a given sequence, either temporally, spatially, in ranking, or in any other manner.

The term "optical system", as used herein, includes, for example, a device capable for optical communication, by modulating a signal using a laser source or visible light, involving transmission of optical pulses, and may include coherent or direct detection, incorporating photon counting methods or baseband circuitry for signal processing.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting and/or the action of receiving. In one example, the phrase "communicating a signal" may refer to the action of transmitting the signal by a first device and may not necessarily include the action of receiving the signal by a second device. In another example, the phrase "communicating a signal" may refer to the action of receiving the signal by a first device and may not necessarily include the action of transmitting the signal by a second device.

Some demonstrative aspects may be used in conjunction with a wireless communication network communicating over a frequency band above 45 Gigahertz (GHz), e.g., 60 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a frequency band above 45 GHz, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

As used herein, the term "circuitry" may, for example, refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, circuitry may include logic, at least partially operable in hardware. In some aspects, the circuitry may be implemented as part of and/or in the form of a radio virtual machine (RVM), for example, as part of a Radio processor (RP) configured to execute code to configured one or more operations and/or functionalities of one or more radio components.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna" or "antenna array," as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Additional Notes and Aspects

Example 1 is an apparatus comprising: transceiver circuitry configured to receive an input signal from a target apparatus; and a processing circuitry configured to: determine position information of a source object and a target object; based on the position information, calculate a relative velocity and determine a Doppler shift or carrier frequency offset in the input signal based on the relative velocity; adjust a local oscillator frequency based on a Doppler measured using the position information in an initial link acquisition phase; and track the Doppler continuously over a range of tens of gigahertz accounting for Doppler phase ambiguities, and correct for a tracked Doppler shift by partially adjusting a local oscillator frequency and by correcting a residual Doppler shift digitally.

In Example 2, the subject matter of Example 1 can optionally include wherein the transceiver circuitry is configured to initially enable closed loop tracking mode based on a threshold and subsequently performed periodically, based upon a maximum of expected Doppler fluctuations.

In Example 3, the subject matter of any of Examples 1-2 can optionally include wherein the processing circuitry is configured to: track the Doppler continuously in a closed loop tracking mode by performing an M-th power operation on a plurality of the received signal samples, and provide an output converted to the frequency domain using a programmable Fast Fourier Transform (FFT) circuitry; wherein the apparatus further comprises: a power meter circuitry configured calculate a power per frequency bin, across a sampling frequency range; and calculate a Doppler shift in the input signal using a frequency index corresponding to a maximum value of the power calculated based on the M-th power operation and output of the FFT circuitry.

In Example 4, the subject matter of Example 3 can optionally include wherein transceiver circuitry is configured to perform the M-th power operation by choosing a value of M as 4 for Quadrature Phase Shift Keying (QPSK) and 2 for Differential Phase Shift Keying (DPSK) or 1 for On off keying (OOK) and Pulse position modulation (PPM) schemes, and wherein a size of an FFT performed by the FFT circuitry is reconfigured as one of 512, 1024, 2048 or 4096 bins based on a baud rate, a sampling rate and a standard.

In Example 5, the subject matter of Example 3 can optionally include wherein the processing circuitry is further configured to estimate and correct Doppler phase ambiguity due to M-th power operations by: performing a FFT directly with a plurality of the received signal samples with an FFT size of at least one of 512, 1024, 2048 or 4096 frequency bins; and using a power meter circuitry to measure the power in a plurality of frequency windows, chosen based on a modulation order and a sampling rate.

In Example 6, the subject matter of Example 3 can optionally include wherein the processing circuitry is further configured to estimate and correct Doppler phase ambiguity by: correcting the tracked Doppler using a plurality of the received signal samples using a Numerically Controlled Oscillator (NCO) circuitry to generate corrected samples; filtering the corrected samples using a plurality of time domain polyphase filters, representing a plurality of windows in the frequency domain; and using a power meter circuitry to measure the power in a plurality of signals filtered using polyphase filters, chosen based on a modulation order and a sampling rate.

In Example 7, the subject matter of Example 6 can optionally include wherein the processing circuitry is configured to identify Doppler phase ambiguity by finding a frequency domain window having maximum power relative to other frequency domain windows, among a plurality of frequency domain windows defined in the frequency domain.

In Example 8, the subject matter of Example 7 can optionally include wherein an additional Doppler shift to be provided in a communication frequency is identified based on the Doppler phase ambiguity; the additional Doppler shift is combined with the Doppler shift; and at least one of the transceiver circuitry for Doppler correction or periodic tuning of local oscillator frequency is used to correct the Doppler.

In Example 9, the subject matter of Example 3 can optionally include wherein the processing circuitry is configured to use a portion of a combined Doppler estimate to correct a Doppler shift in the input signal or center a spectrum using at least one of: a.) a Numerically Controlled Oscillator circuitry based on a cosine lookup table and a sine lookup table; or b.) a Coordinate Rotational Digital Computer (CORDIC) circuitry.

In Example 10, the subject matter of Example 3 can optionally include wherein a portion of a combined Doppler estimate is used to adjust local oscillator frequency through a tuning command, once the Doppler reaches above a programmable threshold.

In Example 11, the subject matter of any of Examples 1-10 can optionally include wherein the processing circuitry is configured to: delay the calculation of a Doppler estimate when signal levels are below a threshold value; calculate the Doppler estimate subsequent to detecting that signal levels are above the threshold; and adjust a period for a next subsequent Doppler estimate calculation.

In Example 12, the subject matter of any of Examples 1-11 can optionally include wherein the processing circuitry is further configured to: calculate an estimate of the Doppler shift in the received signal; refrain from determining phase ambiguity, based on a modulation scheme such as On-off keying (OOK) or Pulse position modulation (PPM); and use the Doppler estimate to correct Doppler shift in the received signal.

In Example 13, the subject matter of Example 3 can optionally include wherein the processing circuitry is configured to: reconfigure the FFT circuitry to measure in-band and out-of-band power after correcting the Doppler shift in the signal, by defining a programmable frequency domain window for power calculation; and calculate an in-band and an out-of-band power is used to deduce a Signal-to-Noise ratio (SNR) and an Optical SNR (OSNR).

In Example 14, the subject matter of any of Examples 1-13 can optionally include wherein the processing circuitry is configured to: switch between two lasers termed as a primary and an auxiliary laser, when operating in satellite constellations that can have a sudden Doppler sign flip due to a crossing orbital motion of the satellites in opposite directions; and tune a local oscillator of an auxiliary laser before a direction crossing point based on a position based Doppler shift calculation.

In Example 15, the subject matter of Example 14 can optionally include wherein the processing circuitry is configured to: switch between a primary and an auxiliary laser when the satellites have moved past one another based on a transceiver measurement of a Doppler sign flip; and operate using a primary laser in one hemisphere when orbiting around the earth and using an auxiliary laser when orbiting in another hemisphere.

Example 16 is a satellite system comprising: transceiver circuitry configured to receive an input signal from a target satellite; and a processing circuitry configured to: determine position information of the satellite system and the target satellite; based on the position information, calculate a relative velocity and determine a Doppler shift or carrier frequency offset in the input signal based on the relative velocity; adjust a local oscillator frequency based on a Doppler measured using the position information in an initial link acquisition phase; and track the Doppler continuously over a range of tens of gigahertz accounting for Doppler phase ambiguities and correct for a tracked Doppler shift by partially adjusting a local oscillator frequency and by correcting a residual Doppler shift digitally.

In Example 17, the subject matter of Example 16 can optionally include wherein the transceiver circuitry is configured to initially enable closed loop tracking mode is based on a threshold and subsequently performed periodically, based upon a maximum of expected Doppler fluctuations.

In Example 18, the subject matter of any of Examples 16-17 can optionally include wherein the processing circuitry is configured to: track the Doppler continuously in a closed loop tracking mode by performing an M-th power operation on a plurality of the received signal samples, and provide an output converted to the frequency domain using a programmable Fast Fourier Transform (FFT) circuitry; wherein the system further comprises: a power meter circuitry configured calculate a power per frequency bin, across a sampling frequency range; and calculate a Doppler shift in the input signal using a frequency index corresponding to a maximum value of the power calculated based on the M-th power operation and output of the FFT circuitry.

In Example 19, the subject matter of any of Examples 16-18 can optionally include wherein the processing circuitry is configured to estimate and correct Doppler phase ambiguity by: performing a FFT directly with a plurality of the received signal samples with an FFT size of at least one of 512, 1024, 2048 or 4096 frequency bins; and using a power meter circuitry to measure the power in a plurality of frequency windows, chosen based on a modulation order and a sampling rate.

In Example 20, the subject matter of Example 18 can optionally include wherein the processing circuitry is configured to estimate and correct Doppler phase ambiguity by: correcting the tracked Doppler using a plurality of the received signal samples using a Numerically Controlled Oscillator (NCO) circuitry to generate corrected samples; filtering the corrected samples using a plurality of time domain polyphase filters, representing a plurality of windows in the frequency domain; and using a power meter circuitry to measure the power in a plurality of signals filtered using polyphase filters, chosen based on a modulation order and a sampling rate.

In Example 21, the subject matter of Example 20 can optionally include wherein an additional Doppler shift to be provided in a communication frequency is identified based on the Doppler phase ambiguity; the additional Doppler shift is combined with the Doppler shift; and at least one of the transceiver circuitry for Doppler correction or periodic tuning of local oscillator frequency is used to correct the Doppler.

Example 22 is a computer-readable medium comprising instructions that, when executed on processing circuitry, cause the processing circuitry to execute operations including: determining position information of a source object and a target object; based on the position information, calculating a relative velocity and determine a Doppler shift or carrier frequency offset in an input signal based on the relative velocity; adjusting a local oscillator frequency based on a Doppler measured using the position information in an initial link acquisition phase; and tracking the Doppler continuously over a range of tens of gigahertz accounting for Doppler phase ambiguities and correct for a tracked Doppler shift by partially adjusting a local oscillator frequency and by correcting a residual Doppler shift digitally.

In Example 23, the subject matter of Example 22 can optionally include wherein the operations further comprise initially enabling closed loop tracking mode is based on a threshold and subsequently performed periodically, based upon a maximum of expected Doppler fluctuations.

In Example 24, the subject matter of any of Examples 22-23 can optionally include tracking the Doppler continuously in a closed loop tracking mode by performing an M-th power operation on a plurality of the received signal samples; providing an output converted to the frequency domain; calculating a power per frequency bin, across a sampling frequency range; and calculating a Doppler shift in the input signal using a frequency index corresponding to a maximum value of the power calculated based on the M-th power operation frequency domain output.

In Example 25, the subject matter of any of Examples 22-24 can optionally include wherein the operations to estimate and correct Doppler phase ambiguity include correcting the tracked Doppler using a plurality of the received signal samples using a Numerically Controlled Oscillator (NCO) circuitry to generate corrected samples; filtering the corrected samples using a plurality of time domain polyphase filters, representing a plurality of windows in the frequency domain; and using a power meter circuitry to measure the power in a plurality of signals filtered using polyphase filters, chosen based on a modulation order and a sampling rate.

The above detailed description includes references to the accompanying drawings, which form a part of the detailed description. The drawings show, by way of illustration, specific aspects in which the invention can be practiced. These aspects are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description, with each claim standing on its own as a separate aspect, and it is contemplated that such aspects can be combined with each other in various combinations or permutations. The scope of the invention should be determined with reference to the appended claims, along with the full scope of equivalents to which such claims are legally entitled.

We claim:

1. An apparatus comprising:

transceiver circuitry configured to receive an input signal from a target apparatus; and a processing circuitry configured to:

determine position information of a source object and a target object;

based on the position information, calculate a relative velocity and determine a Doppler shift or carrier frequency offset in the input signal based on the relative velocity;

adjust a local oscillator frequency based on a Doppler measured using the position information in an initial link acquisition phase; and track the Doppler continuously over a range of tens of gigahertz accounting for Doppler phase ambiguities, and correct for a tracked Doppler shift by partially adjusting a local oscillator frequency and by correcting a residual Doppler shift digitally.

2. The apparatus of claim 1, wherein the transceiver circuitry is configured to initially enable closed loop tracking mode based on a threshold and subsequently performed periodically, based upon a maximum of expected Doppler fluctuations.

3. The apparatus of claim 1, wherein the processing circuitry is configured to:

track the Doppler continuously in a closed loop tracking mode by performing an M-th power operation on a plurality of the received signal samples, and provide an output converted to the frequency domain using a programmable Fast Fourier Transform (FFT) circuitry; wherein the apparatus further comprises:

a power meter circuitry configured calculate a power per frequency bin, across a sampling frequency range; and calculate a Doppler shift in the input signal using a frequency index corresponding to a maximum value of the power calculated based on the M-th power operation and output of the FFT circuitry.

4. The apparatus of claim 3, wherein transceiver circuitry is configured to perform the M-th power operation by choosing a value of M as 4 for Quadrature Phase Shift Keying (QPSK) and 2 for Differential Phase Shift Keying (DPSK) or 1 for On off keying (OOK) and Pulse position modulation (PPM) schemes, and wherein a size of an FFT performed by the FFT circuitry is reconfigured as one of 512, 1024, 2048 or 4096 bins based on a baud rate, a sampling rate and a standard.

5. The apparatus of claim 3, wherein the processing circuitry is further configured to estimate and correct Doppler phase ambiguity due to M-th power operations by:

performing a FFT directly with a plurality of the received signal samples with an FFT size of at least one of 512, 1024, 2048 or 4096 frequency bins; and using a power meter circuitry to measure the power in a plurality of frequency windows, chosen based on a modulation order and a sampling rate.

6. The apparatus of claim 3, wherein the processing circuitry is further configured to estimate and correct Doppler phase ambiguity by:

correcting the tracked Doppler using a plurality of the received signal samples using a Numerically Controlled Oscillator (NCO) circuitry to generate corrected samples;

filtering the corrected samples using a plurality of time domain polyphase filters, representing a plurality of windows in the frequency domain; and using a power meter circuitry to measure the power in a plurality of signals filtered using polyphase filters, chosen based on a modulation order and a sampling rate.

7. The apparatus of claim 6, wherein the processing circuitry is configured to identify Doppler phase ambiguity by finding a frequency domain window having maximum power relative to other frequency domain windows, among a plurality of frequency domain windows defined in the frequency domain.

8. The apparatus of claim 7, wherein:

an additional Doppler shift to be provided in a communication frequency is identified based on the Doppler phase ambiguity;

the additional Doppler shift is combined with the Doppler shift; and at least one of the transceiver circuitry for Doppler correction or periodic tuning of local oscillator frequency is used to correct the Doppler.

9. The apparatus of claim 3, wherein the processing circuitry is configured to use a portion of a combined Doppler estimate to correct a Doppler shift in the input signal or center a spectrum using at least one of: a.) a Numerically Controlled Oscillator circuitry based on a cosine lookup table and a sine lookup table; or b.) a Coordinate Rotational Digital Computer (CORDIC) circuitry.

10. The apparatus of claim 3, wherein a portion of a combined Doppler estimate is used to adjust local oscillator frequency through a tuning command, once the Doppler reaches above a programmable threshold.

11. The apparatus of claim 1, wherein the processing circuitry is configured to:

delay the calculation of a Doppler estimate when signal levels are below a threshold value;

calculate the Doppler estimate subsequent to detecting that signal levels are above the threshold; and adjust a period for a next subsequent Doppler estimate calculation.

12. The apparatus of claim 1, wherein the processing circuitry is further configured to:

calculate an estimate of the Doppler shift in the received signal;

refrain from determining phase ambiguity, based on a modulation scheme such as On-off keying (OOK) or Pulse position modulation (PPM); and use the Doppler estimate to correct Doppler shift in the received signal.

13. The apparatus of claim 3, wherein the processing circuitry is configured to:

reconfigure the FFT circuitry to measure in-band and out-of-band power after correcting the Doppler shift in the signal, by defining a programmable frequency domain window for power calculation; and calculate an in-band and an out-of-band power is used to deduce a Signal-to-Noise ratio (SNR) and an Optical SNR (OSNR).

14. The apparatus of claim 1, wherein the processing circuitry is configured to:

switch between two lasers termed as a primary and an auxiliary laser, when operating in satellite constellations that can have a sudden Doppler sign flip due to a crossing orbital motion of the satellites in opposite directions; and tune a local oscillator of an auxiliary laser before a direction crossing point based on a position based Doppler shift calculation.

15. The apparatus of claim 14, wherein the processing circuitry is configured to:

switch between a primary and an auxiliary laser when the satellites have moved past one another based on a transceiver measurement of a Doppler sign flip; and operate using a primary laser in one hemisphere when orbiting around the earth and using an auxiliary laser when orbiting in another hemisphere.

16. A satellite system comprising:

transceiver circuitry configured to receive an input signal from a target satellite; and a processing circuitry configured to:

determine position information of the satellite system and the target satellite;

based on the position information, calculate a relative velocity and determine a Doppler shift or carrier frequency offset in the input signal based on the relative velocity;

adjust a local oscillator frequency based on a Doppler measured using the position information in an initial link acquisition phase; and track the Doppler continuously over a range of tens of gigahertz accounting for Doppler phase ambiguities and correct for a tracked Doppler shift by partially adjusting a local oscillator frequency and by correcting a residual Doppler shift digitally.

17. The system of claim 16, wherein the transceiver circuitry is configured to initially enable closed loop tracking mode is based on a threshold and subsequently performed periodically, based upon a maximum of expected Doppler fluctuations.

18. The system of claim 16, wherein the processing circuitry is configured to:

track the Doppler continuously in a closed loop tracking mode by performing an M-th power operation on a plurality of the received signal samples, and provide an output converted to the frequency domain using a programmable Fast Fourier Transform (FFT) circuitry; wherein the system further comprises:

a power meter circuitry configured calculate a power per frequency bin, across a sampling frequency range; and calculate a Doppler shift in the input signal using a frequency index corresponding to a maximum value of the power calculated based on the M-th power operation and output of the FFT circuitry.

19. The system of claim 16, wherein the processing circuitry is configured to estimate and correct Doppler phase ambiguity by:

performing a FFT directly with a plurality of the received signal samples with an FFT size of at least one of 512, 1024, 2048 or 4096 frequency bins; and using a power meter circuitry to measure the power in a plurality of frequency windows, chosen based on a modulation order and a sampling rate.

20. The system of claim 18, wherein the processing circuitry is configured to estimate and correct Doppler phase ambiguity by:

correcting the tracked Doppler using a plurality of the received signal samples using a Numerically Controlled Oscillator (NCO) circuitry to generate corrected samples;

filtering the corrected samples using a plurality of time domain polyphase filters, representing a plurality of windows in the frequency domain; and using a power meter circuitry to measure the power in a plurality of signals filtered using polyphase filters, chosen based on a modulation order and a sampling rate.

21. The system of claim 20, wherein:

an additional Doppler shift to be provided in a communication frequency is identified based on the Doppler phase ambiguity;

the additional Doppler shift is combined with the Doppler shift; and at least one of the transceiver circuitry for Doppler correction or periodic tuning of local oscillator frequency is used to correct the Doppler.

22. A non-transitory computer-readable medium comprising instructions that, when executed on processing circuitry, cause the processing circuitry to execute operations including:

determining position information of a source object and a target object;

based on the position information, calculating a relative velocity and determining a Doppler shift or carrier frequency offset in an input signal based on the relative velocity;

adjusting a local oscillator frequency based on a Doppler measured using the position information in an initial link acquisition phase; and tracking the Doppler continuously over a range of tens of gigahertz accounting for Doppler phase ambiguities and correcting for a tracked Doppler shift by partially adjusting a local oscillator frequency and by correcting a residual Doppler shift digitally.

23. The non-transitory computer-readable medium of claim 22, wherein the operations further comprise:

initially enabling closed loop tracking mode, wherein closed loop tracking mode is based on a threshold and subsequently performed periodically, based upon a maximum of expected Doppler fluctuations.

24. The non-transitory computer-readable medium of claim 22, wherein the operations further comprise:

tracking the Doppler continuously in a closed loop tracking mode by performing an M-th power operation on a plurality of the received signal samples;

providing an output converted to the frequency domain;

calculating a power per frequency bin, across a sampling frequency range; and calculating a Doppler shift in the input signal using a frequency index corresponding to a maximum value of the power calculated based on the M-th power operation frequency domain output.

25. The non-transitory computer-readable medium of claim 22, wherein the operations to estimate and correct Doppler phase ambiguity include:

correcting the tracked Doppler using a plurality of the received signal samples using a Numerically Controlled Oscillator (NCO) circuitry to generate corrected samples;

filtering the corrected samples using a plurality of time domain polyphase filters, representing a plurality of windows in the frequency domain; and using a power meter circuitry to measure the power in a plurality of signals filtered using polyphase filters, chosen based on a modulation order and a sampling rate.

* * * * *